US007417758B2

(12) United States Patent
Miyake et al.

(10) Patent No.: US 7,417,758 B2
(45) Date of Patent: Aug. 26, 2008

(54) IMAGE FORMING APPARATUS, AND SHEET PLACING DIRECTION INSTRUCTING METHOD

(75) Inventors: Toshiyuki Miyake, Ibaraki (JP); Takayuki Fujii, Tokyo (JP); Kuniyasu Kimura, Ibaraki (JP); Yasuo Fukatsu, Chiba (JP)

(73) Assignee: Canon Kabushiki Kaisha (JP)

( * ) Notice: Subject to any disclaimer, the term of this patent is extended or adjusted under 35 U.S.C. 154(b) by 643 days.

(21) Appl. No.: 10/794,122

(22) Filed: Mar. 5, 2004

(65) Prior Publication Data

US 2004/0174552 A1 Sep. 9, 2004

(30) Foreign Application Priority Data

Mar. 5, 2003 (JP) ............................ 2003-058752

(51) Int. Cl.
*G06F 3/12* (2006.01)
*G06K 15/00* (2006.01)

(52) U.S. Cl. ..................... 358/1.15; 358/1.12; 358/1.13

(58) Field of Classification Search ................ 358/1.15, 358/1.1, 1.2, 1.4, 1.5, 1.6, 1.9, 1.12, 1.13, 358/1.18; 347/2, 3, 4, 5, 157, 155, 156; 399/1, 399/193, 192, 382, 385, 389, 392, 393, 394, 399/403, 407, 408, 410

See application file for complete search history.

(56) References Cited

U.S. PATENT DOCUMENTS 6,315,288 B1 * 11/2001 Sugishima et al. .......... 271/303

FOREIGN PATENT DOCUMENTS

| | | | |
|---|---|---|---|
| JP | 62-213372 A | | 9/1987 |
| JP | 01040826 A | * | 2/1989 |
| JP | 2002-211797 A | | 8/2000 |
| JP | 2000-295410 A | | 10/2000 |
| JP | 2002-152442 A | | 5/2002 |

* cited by examiner

*Primary Examiner*—Dov Popovici
(74) *Attorney, Agent, or Firm*—Rossi, Kimms & McDowell, LLP

(57) ABSTRACT

An image forming apparatus that is capable of performing post-processing so as to ensure that sheets on which images are formed and inserted sheets are aligned in orientation when performing sheet insertion processing and post-processing in combination. The image forming apparatus is capable of having attached thereto a finisher that performs post-processing on sheets with images formed thereon. An insertion sheet is placed on one of sheet supply trays and a manual feed tray. An operating/display section controller inputs a post-processing instruction for causing the finisher to perform post-processing. A placing direction in which the insertion sheet is to be placed on one of the sheet supply trays and the manual feed tray is instructed according to the post-processing instruction input by the operating/display section.

8 Claims, 31 Drawing Sheets

IMAGE FORMING APPARATUS, AND SHEET PLACING DIRECTION INSTRUCTING METHOD

BACKGROUND OF THE INVENTION

1. Field of the Invention

The present invention relates to an image forming apparatus that has attached thereto a post-processing device that carries out post-processing a sheet on which an image is formed, and a sheet placing direction instructing method.

2. Description of the Related Art

Conventionally, image forming apparatuses, such as copying machines and laser printers, that permit insertion of colored sheets, OHP sheets, pre-printed sheets or the like into specific pages of an output bundle of sheets, are known (for example, Japanese Laid-Open Patent Publication (Kokai) No. 2000-295410). Moreover, image forming apparatuses are known that are capable of outputting only monochrome or black-and-white image sheets, and permitting insertion of color output sheets in an output bundle of sheets.

With these image forming apparatuses, it is possible to select among various modes, such as a cover sheet mode for inserting a sheet at the first page of a bundle of sheets, a back cover sheet mode for inserting a sheet at the last page of a bundle of sheets, or an interleaved sheet mode for inserting sheets between the first sheet and the last sheet in a bundle of sheets, so that a sheet can be inserted at any given page.

When inserting a sheet in such image forming apparatuses, one of a plurality of cassettes in which recording sheets are contained is designated as an exclusive insertion sheet cassette, in which insertion sheets such as cover sheets and interleaved sheets are contained. Recording sheets are supplied from cassettes other than the exclusive insertion sheet cassette when an insert page is not reached, and an insertion sheet is supplied from the designated exclusive insertion sheet cassette when the insert page is reached. Then, all the supplied sheets are conveyed to an image forming section. However, although images are formed on the recording sheets, no image is formed on the insertion sheet.

Moreover, when inserting a sheet using a different method, an inserter is disposed at a discharge port of the image forming apparatus. The inserter is provided with a cassette that contains insertion sheets. Then, the inserter receives from the image forming apparatus recording sheets on which images have been formed and inserts a sheet, such as a cover sheet or an interleaved sheet supplied from a cassette inside the inserter, between given pages of the recording sheets, after which a bundle of sheets with the insertion sheet inserted therein, is output from a discharge port (see, for example, Japanese Laid-Open Patent Publication (Kokai) No. 2000-295410).

Moreover, a finisher (sheet processing device) is also known, which is connected to the image forming apparatus, for aligning, aligning, and binding or stitching sheets, and which, when provided with a cassette, also functions as an inserter.

Further, an image forming apparatus is known, which temporarily stores an image in a memory and rotates the image to match the sheet size and sheet orientation, after which it forms the image on the sheet (Japanese Laid-Open Patent Publication (Kokai) No. S62-213372). By combining the image rotation processing with post-processing such as binding, it becomes possible to perform post-processing at any given position on a sheet that cannot be post-processed except at a preset position vis-à-vis the image forming apparatus.

However, with the conventional image forming apparatus and sheet processing device described above, if sheet insertion processing and post-processing are performed, when image rotation is performed to match a specified post-processing position, the orientation of the sheet on which the image is formed and the orientation of the inserted sheet sometimes do not match.

SUMMARY OF THE INVENTION

It is an object of the present invention to provide an image forming apparatus that is capable of performing post-processing so as to ensure that sheets on which images are formed and inserted sheets are aligned in orientation when performing sheet insertion processing and post-processing in combination, and a sheet placing direction instructing method.

To attain the above object, in a first aspect of the present invention, there is provided an image forming apparatus capable of having attached thereto a post-processing device that performs post-processing on sheets with images formed thereon, comprising a first conveying device that conveys a first sheet, an image forming device that forms an image on the first sheet, a sheet supply tray on which a second sheet is placed, a second conveying device that conveys the second sheet from the sheet supply tray, an input device that inputs a post-processing instruction for causing the post-processing device to perform post-processing, and a placing direction instructing device that instructs a placing direction in which the second sheet is to be placed on the sheet supply tray, according to the post-processing instruction input by the input device.

Preferably, the placing direction instructing device instructs the placing direction in which the second sheet is to be placed on the sheet supply tray, according to an orientation in which an image is formed on the first sheet by the image forming device.

Also preferably, the input device inputs an instruction for execution of processing in a post-processing mode for post-processing on the first sheet and the second sheet and an instruction for execution of processing in an insertion sheet mode for inserting the second sheet into sheets as the first sheet, and the placing direction instructing device instructs the placing direction in which the second sheet is to be placed on the sheet supply tray, according to the instruction input by the input device.

Also preferably, the post-processing device performs stapling processing on the first sheet, the input device inputs a stapling position at which the first sheet is to be stapled, and when the stapling position input by the input device is a first edge of the first sheet, the image forming device forms an image on the first sheet in an orientation directly opposite an orientation in which the image would be formed when the stapling position input by the input device is a second edge of the first sheet opposite to the first edge.

Also preferably, the image forming apparatus comprises a second sheet supply tray on which the first sheet is placed, and the sheet supply tray on which the second sheet is placed comprises one of a manual feed tray and a sheet feed cassette, which is different from the second sheet supply tray.

More preferably, the image forming apparatus comprises a conveying path disposed inside the image forming apparatus and not extending through the image forming device, and the second conveying device conveys the second sheet via the conveying path from the sheet supply tray on which the second sheet is placed.

Also preferably, the placing direction instructing device displays the placing direction in which the second sheet is placed on the sheet supply tray and a location of the sheet supply tray in the image forming apparatus.

Also preferably, the post-processing comprises a process selected from the group consisting of a stapling process, a hole-punching process, a bonding process, and a cutting process.

To attain the above object, in a second aspect of the present invention, there is provided an image forming apparatus comprising a first conveying device that conveys a first sheet, an image forming device that forms an image on the first sheet, a sheet supply tray on which a second sheet is placed, a second conveying device that conveys the second sheet from the sheet supply tray, a post-processing device that performs post-processing on the first sheet, on which an image has been formed by the image forming device, and the second sheet, an input device that inputs a post-processing instruction for causing the post-processing device to perform post-processing, and a placing direction instructing device that instructs a placing direction in which the second sheet is to be placed on the sheet supply tray, according to the post-processing instruction input by the input device.

To attain the above object, in a third aspect of the present invention, there is provided a sheet placing direction instructing method for an image forming apparatus including a first conveying device that conveys a first sheet, an image forming device that forms an image on the first sheet, a sheet supply tray on which a second sheet is placed, a second conveying device that conveys the second sheet from the sheet supply tray, and a post-processing device that performs post-processing on the first sheet, on which an image has been formed by the image forming device, and the second sheet, the method comprising an input step of inputting a post-processing instruction for causing the post-processing device to perform post-processing, and a placing direction instructing step of instructing a placing direction in which the second sheet is to be placed on the sheet supply tray, according to the post-processing instruction input in the input step.

The above and other objects and advantages of the invention will become more apparent from the following detailed description taken in conjunction with the accompanying drawings.

DETAILED DESCRIPTION OF THE PREFERRED EMBODIMENTS

The present invention will now be described in detail below with reference to the drawings showing preferred embodiment thereof.

Figure 1:
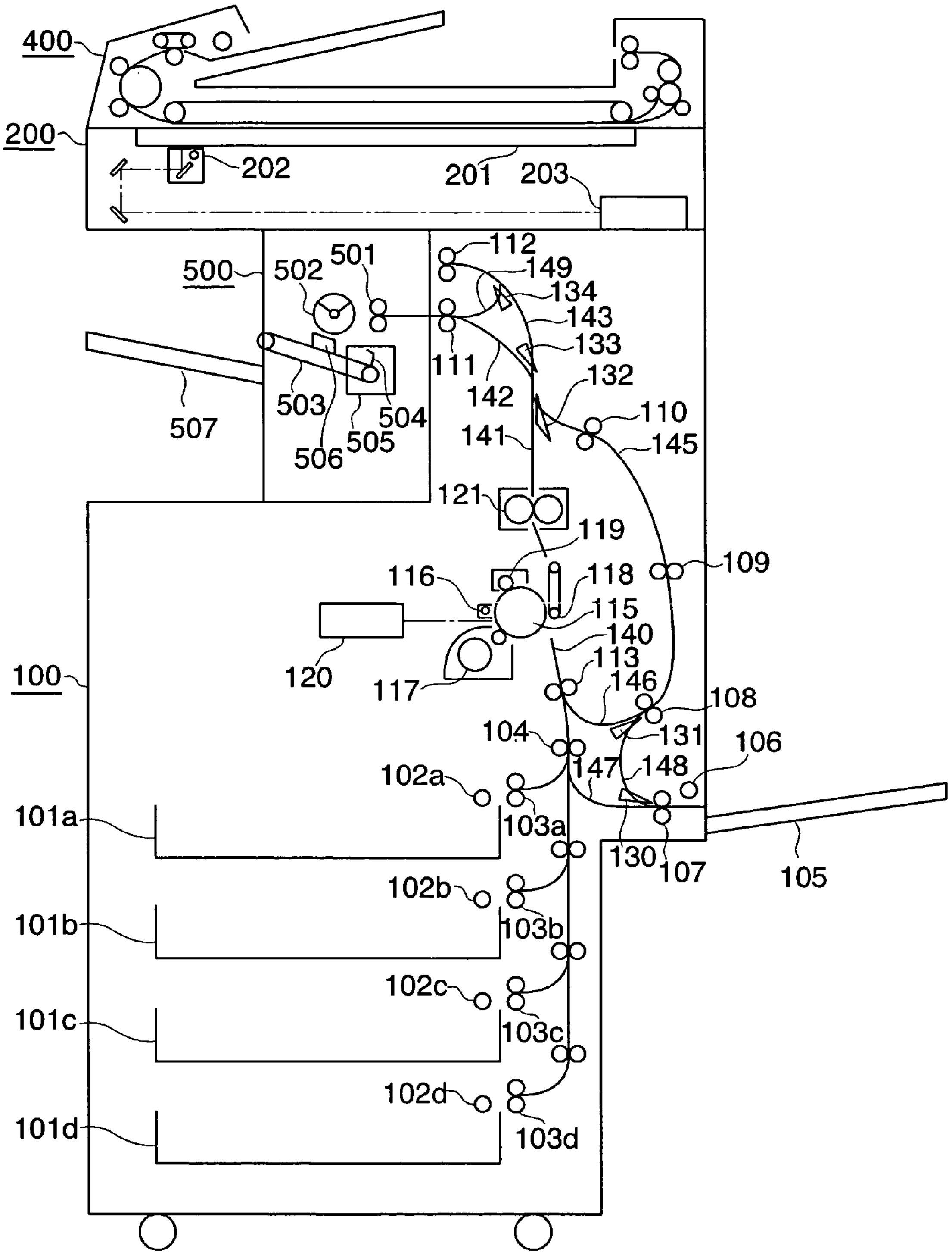
FIG. 1 is a cross-sectional view of the construction of an image forming apparatus according to an embodiment of the present invention.

FIG. 1 is a cross-sectional view of the construction of an image forming apparatus according to an embodiment of the present invention. The image forming apparatus is comprised of an image forming apparatus main body having a printer 100 and an image reader 200, and a finisher 500. The image reader 200 has attached thereto an original feeder 400 which feeds originals set face up on an original tray one page at a time, in order from the first page, in a leftward direction as viewed in FIG. 1 and then along a curved path and to a predetermined position on a platen glass 201, where the original is stopped. In this state the original is scanned by a scanner device 202 in a direction from left to right in FIG. 1.

When the scanner device 202 scans the original, the original scanning surface is illuminated by lamp light from the scanner device 202, and the reflected light from the original is guided via a mirror to a lens to pass therethrough and forms an image on an image pickup surface of an image sensor 203. The optically scanned image is then converted into image data by the image sensor 203 and is output therefrom. The image data output from the image sensor 203 is then subjected to predetermined processing by an image signal controller 281 (see FIG. 5), after which the processed image data is input as a video signal to an exposure controller 120 inside the printer 100.

Figure 2:
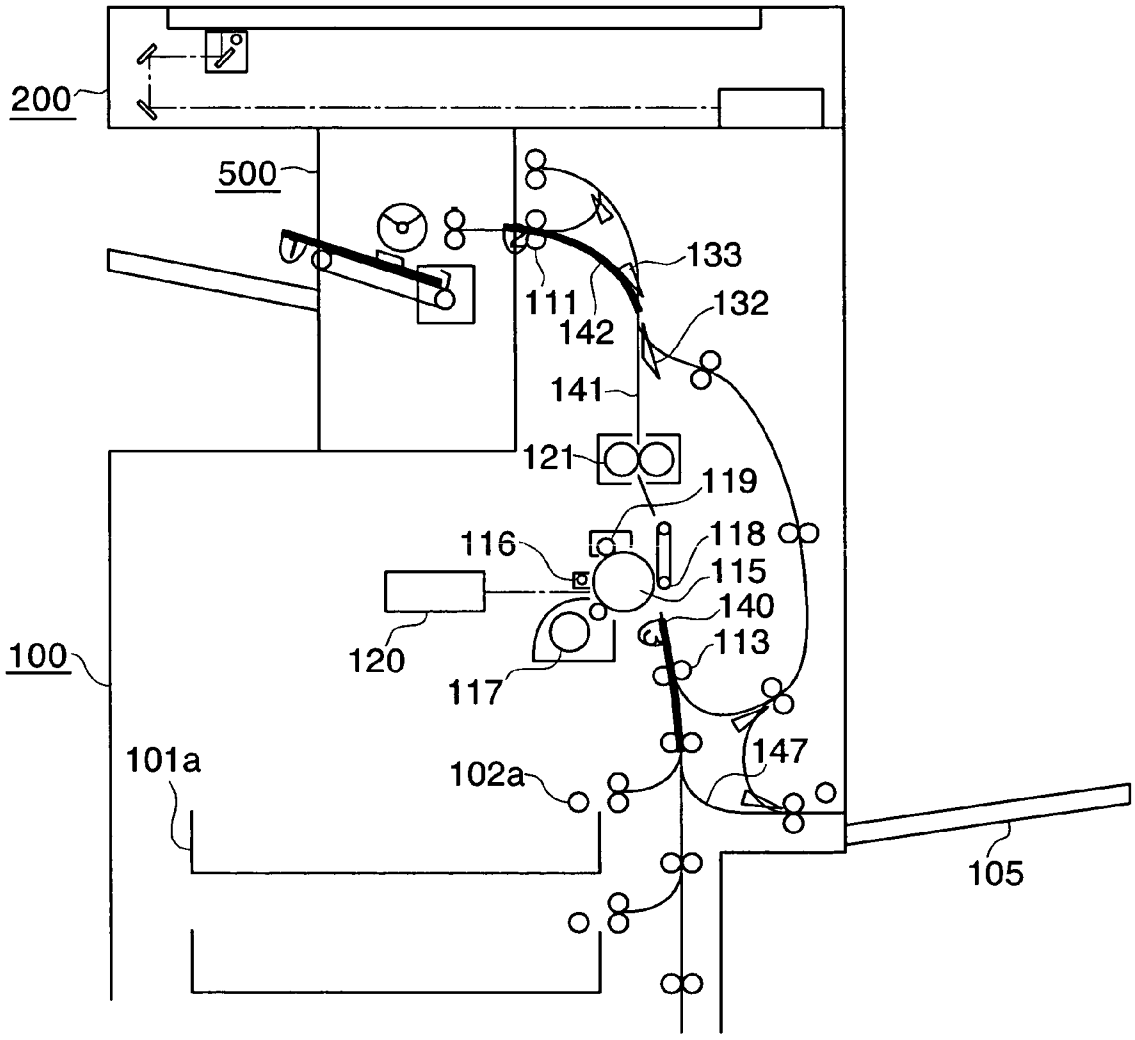
FIG. 2 is a diagram useful in explaining a sheet conveying operation of the image forming apparatus, in a single-sided mode, in which an image is formed on only one side of a sheet.

FIG. 2 is a diagram useful in explaining a sheet conveying operation of the image forming apparatus, in a single-sided mode in which an image is formed on only one side of a sheet. Based on the input video signal, the exposure controller 120 inside the printer 100 modulates and outputs a laser beam. The laser beam is irradiated onto a photosensitive drum 115 by a polygon mirror (not shown) while being scanned. An electrostatic latent image is then formed on the photosensitive drum 115 according to the scanning of the laser beam. The electrostatic latent image thus formed on the photosensitive drum 115 is then visualized as a developed image by a developer supplied from a developing device 117.

Moreover, a sheet fed from any of cassettes 101$a$-101$d$ or a manual feed tray 105 and through a conveying path 147 is temporarily stopped with a leading edge thereof in contact with a resist roller 113, and then the sheet is conveyed between the photosensitive drum 115 and a transfer device 118 in timing synchronous with the start of laser beam irradiation. The developed image formed on the photosensitive drum 115 is then transferred onto the supplied sheet by the transfer device 118. The sheet is corrected for skewing by having its leading edge abutting against the resist roller 113 to be temporarily stopped.

Then, when the sheet onto which the developed image has been transferred is conveyed to a fixing device 121, where the developed image is fixed onto the sheet by heating and pressing. The sheet that has passed through the fixing device 121 is then guided by a flapper 133 onto a conveying path 142 and discharged through a discharge roller 111 from the printer 100 toward an external finisher 500. At this time, the sheet is discharged in a so-called face down state, in which the surface on which the image is formed lies face down. Therefore, the sheets of a discharged bundle of sheets are in the correct order when image formation is carried out in order from the first page.

It should be noted that, in FIG. 2 and subsequent figures, for convenience, numerical values such as "1", "2" and "3" expressing page numbers are added to the surface of the sheet.

FIGS. 3A, 3B, 3C, 3D, 3E, 3F and 3G are diagrams useful in explaining a sheet conveying operation of the image forming apparatus, in a double-sided mode in which images are formed on both sides of a sheet. As is the case with the single-sided mode, a sheet fed from any of the cassettes 101$a$-101$d$ or the manual feed tray 105 and guided through the conveying path 147 is temporarily stopped with its leading edge abutting against the resist roller 113, and then the sheet is conveyed between the photosensitive drum 115 and the transfer device 118. The transfer device 118 transfers the developed image formed on the photosensitive drum 115 onto the supplied sheet, and when the sheet passes through the fixing device 121, an image is formed on one side of the sheet.

Figure 3A:
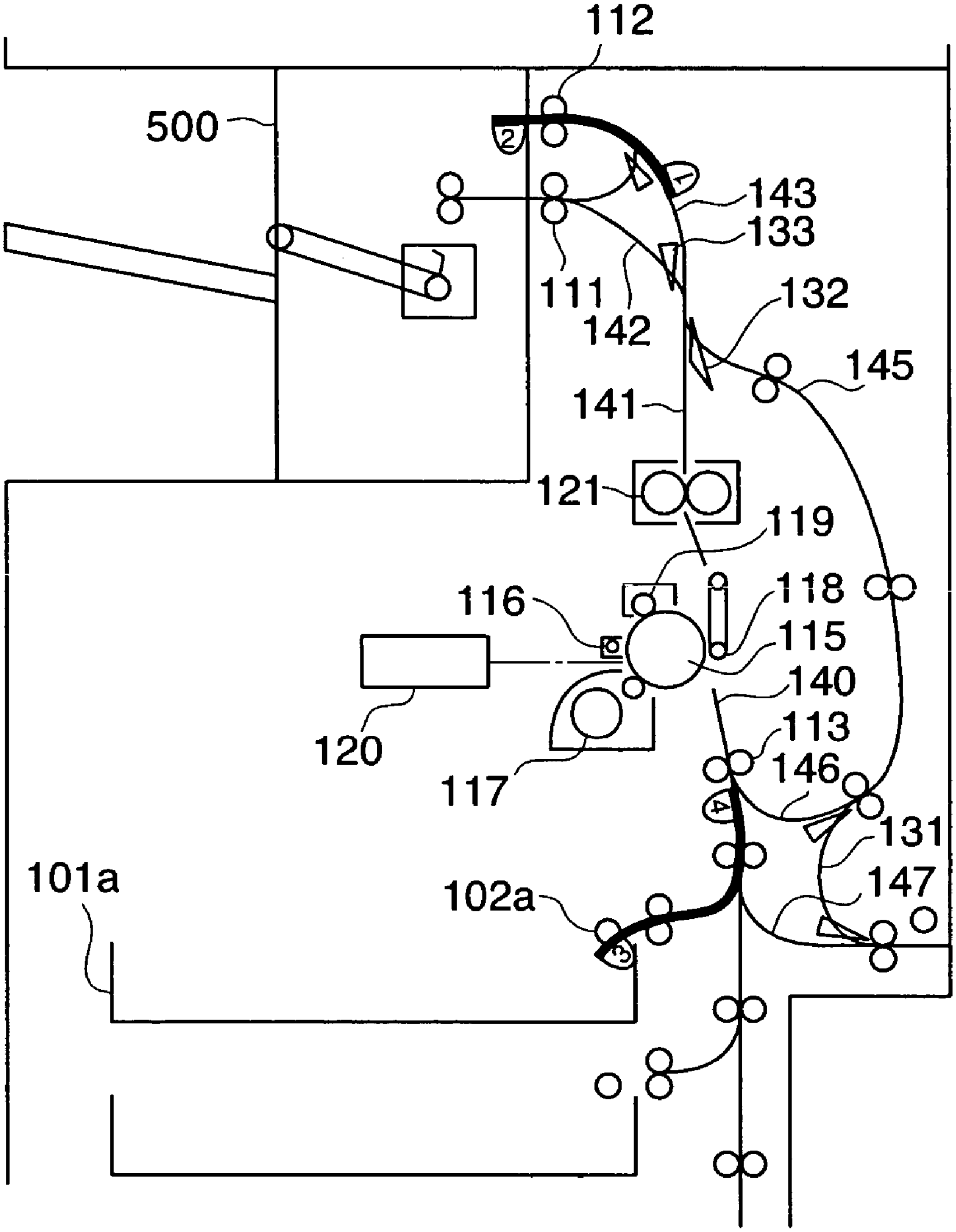
FIGS. 3A, 3B, 3C, 3D, 3E, 3F and 3G are diagrams useful in explaining a sheet conveying operation of the image forming apparatus, in a double-sided mode, in which images are formed on both sides of a sheet.
Figure 3B:
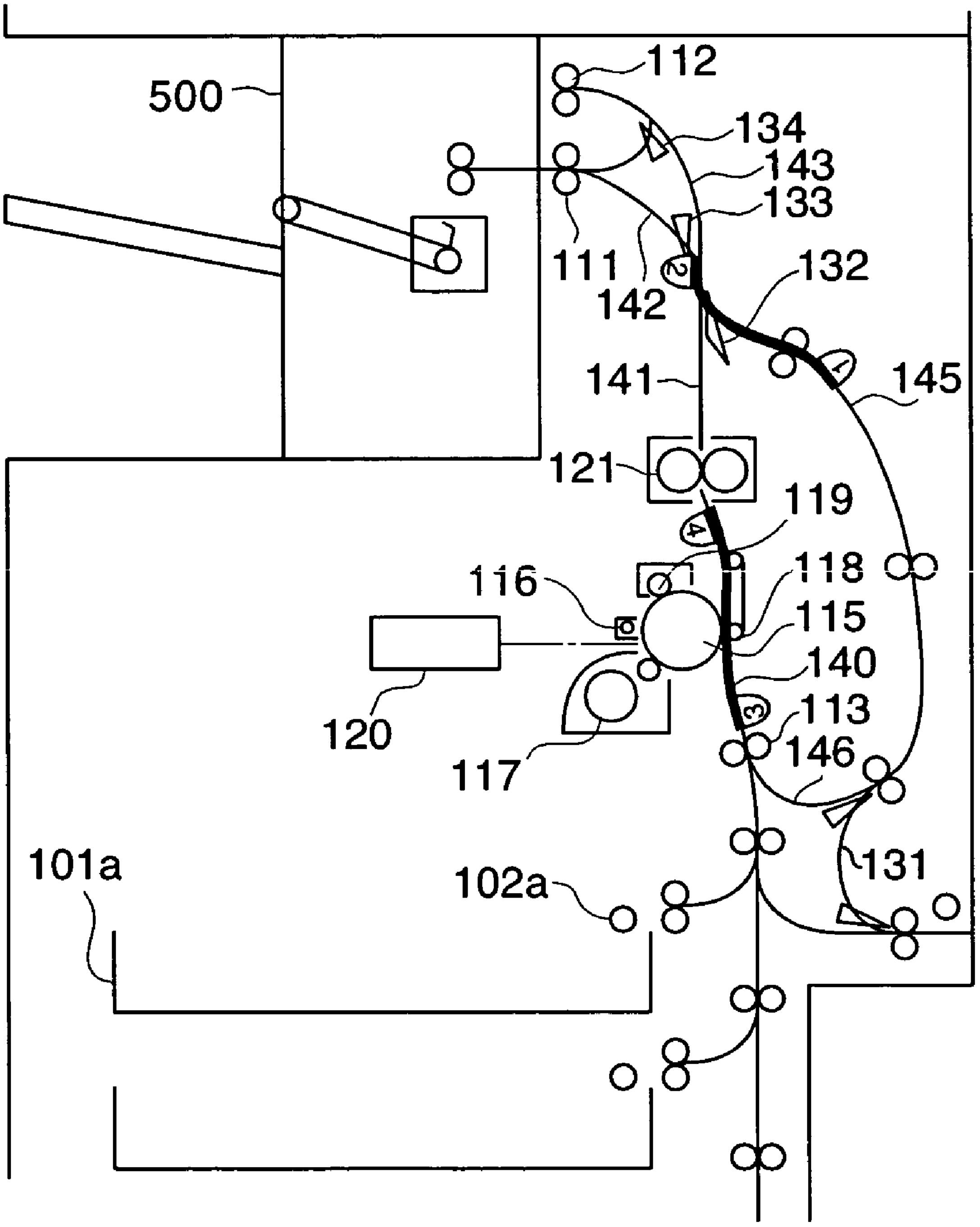
Figure 3C:
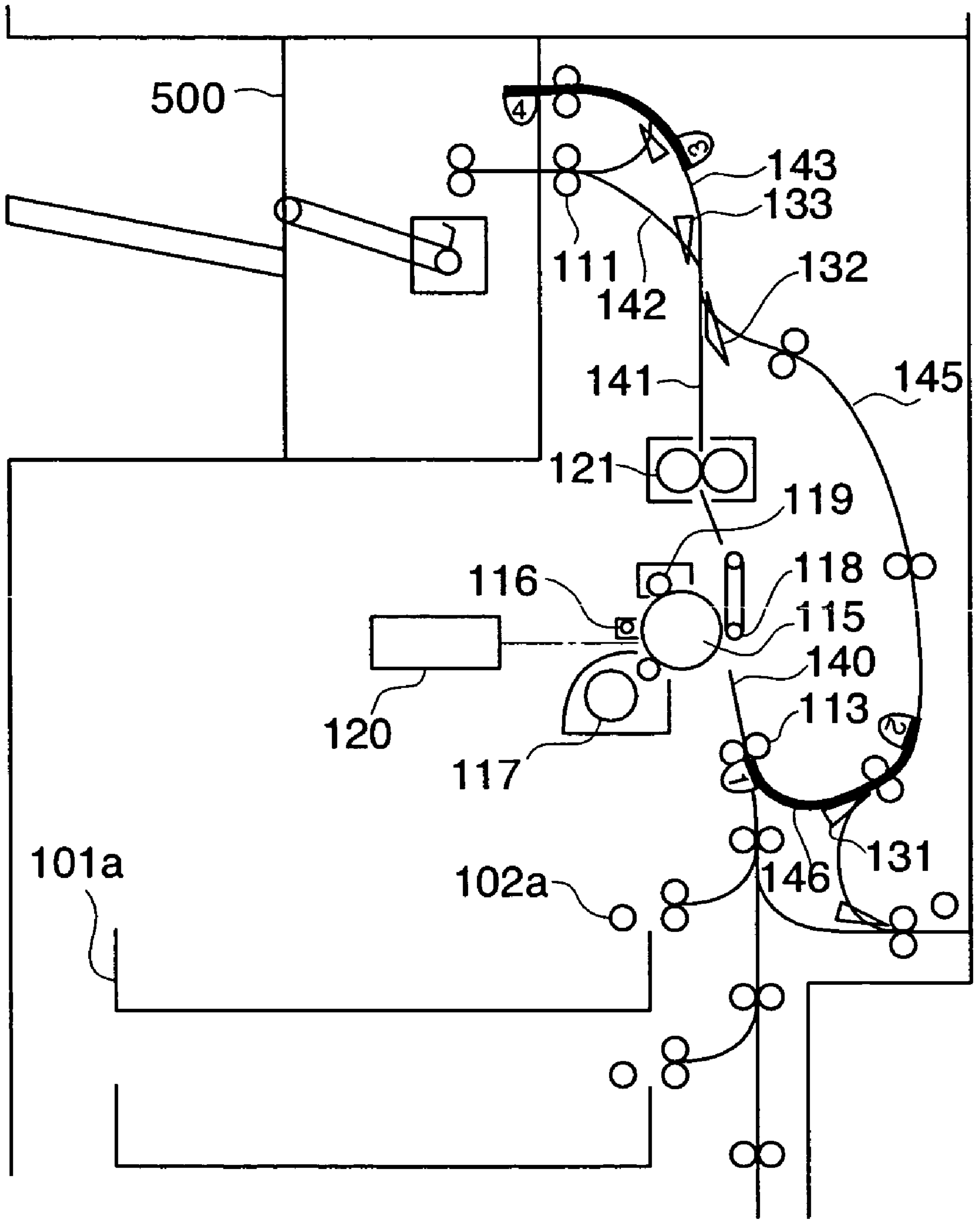

When the flapper 133 is switched, the sheet is guided from a conveying path 141 to a conveying path 143 and is stopped with the leading edge of the sheet being inserted in the nip of an inverting roller 112 (FIG. 3A). Then, when the flapper 133 is switched, the inverting roller 112 is reversely driven and the sheet is guided from the conveying path 143 to a double-sided conveying path 145 (FIG. 3B), and then the sheet is guided by a flapper 131 to a conveying path 146 and once more the leading edge of the sheet is brought into abutment against the resist roller 113 and stopped (FIG. 3C). At this point, the sheet is upside down.

Figure 3D:
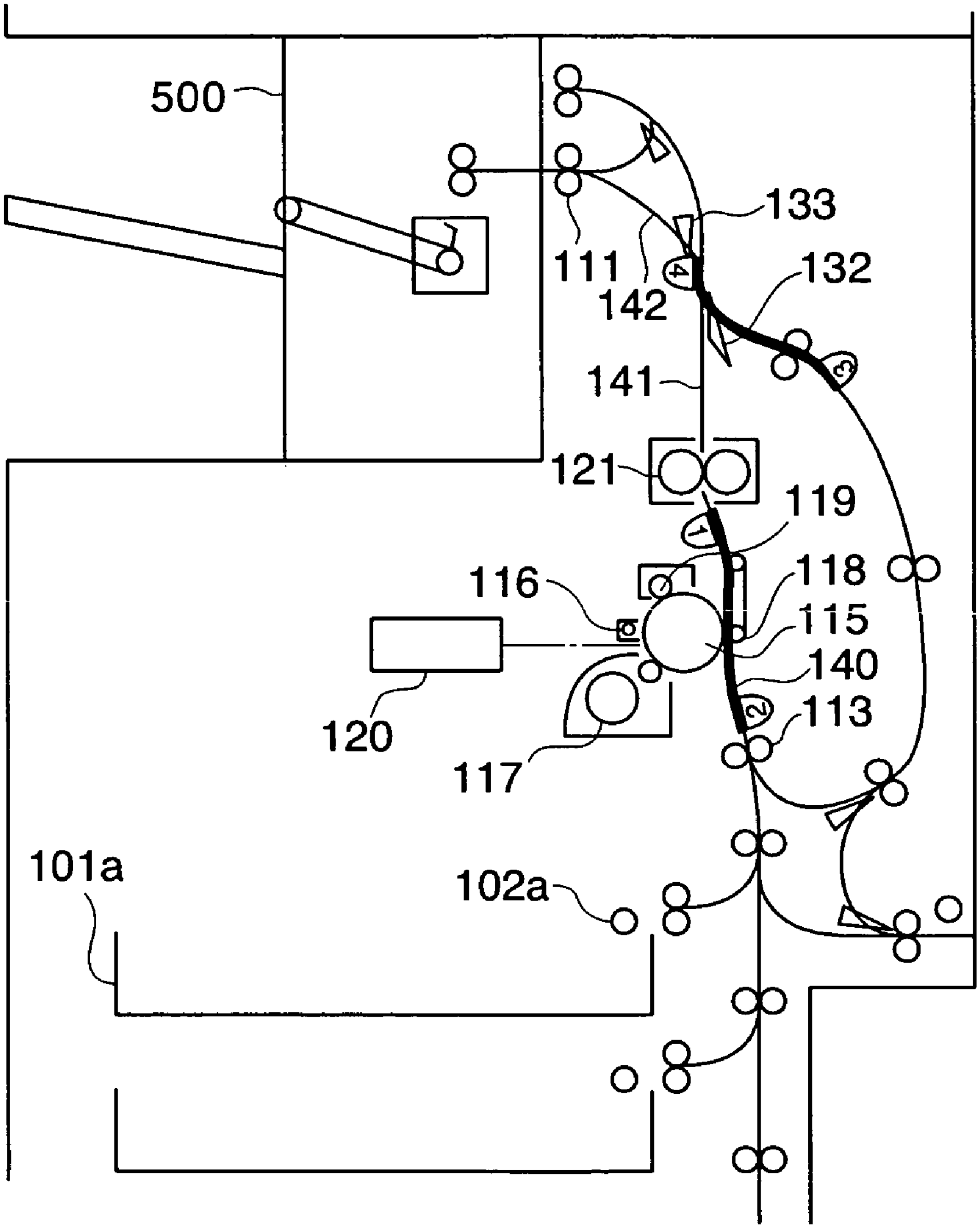
Figure 3E:
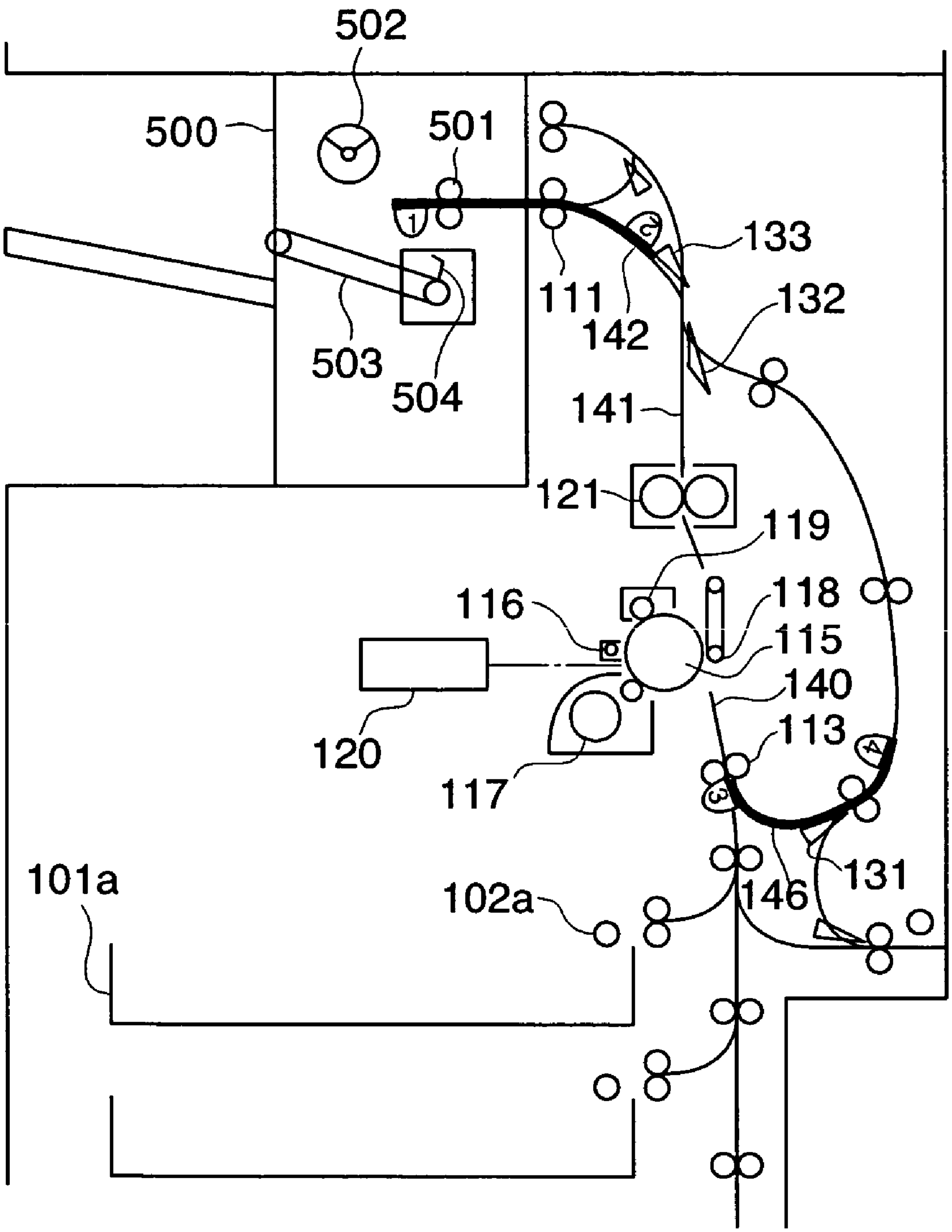

Hereafter, the sheet is once again fed between the photosensitive drum 115 and the transfer device 118, where the transfer device 118 transfers the developed image formed on the photosensitive drum 115 onto the other surface, on which no image has been formed, of the supplied sheet (FIG. 3D). Then, the sheet passes through the fixing device 121 and the image is fixed onto the other surface of the sheet, after which, when the flapper 133 is switched, the sheet is guided from the conveying path 141 to the conveying path 142 and discharged from the printer 100 through the discharge roller 111 and toward the external finisher 500 (FIG. 3E).

At this time, the sheet is discharged so that the surface of the sheet on which the later image is formed (the surface of the first page) lies face down. By so doing, image formation on the back surface of the sheet is performed first in order to match the page order when the sheet is discharged from the printer 100 to the external finisher 500. It should be noted that when conducting double-sided image formation for a plurality of sheets, although in the present embodiment image formation of the plurality of sheets (here, two sheets) is performed in parallel, image formation of the next sheet may begin after images are formed on both the front and back surfaces of the first sheet.

Figure 3F:
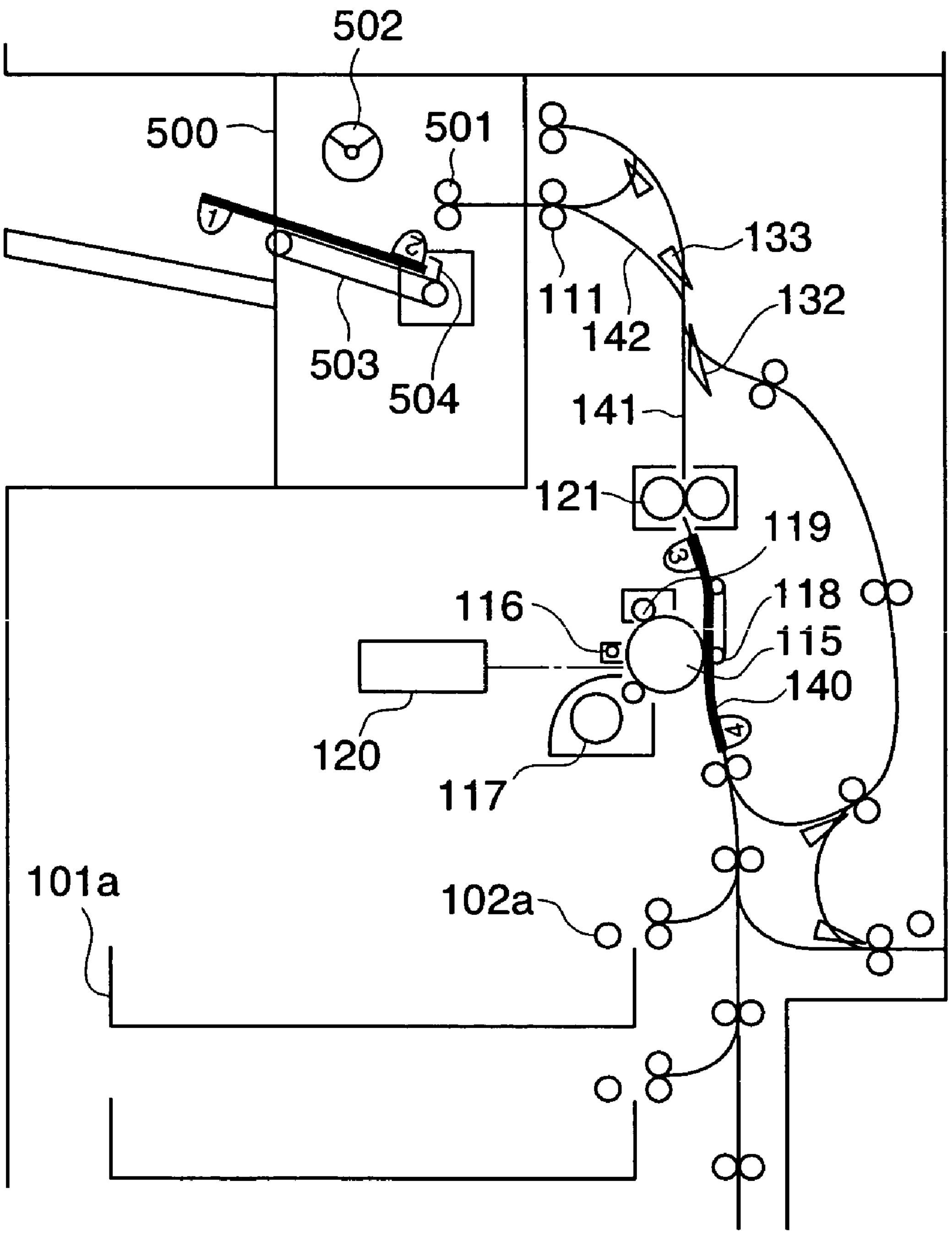
Figure 3G:
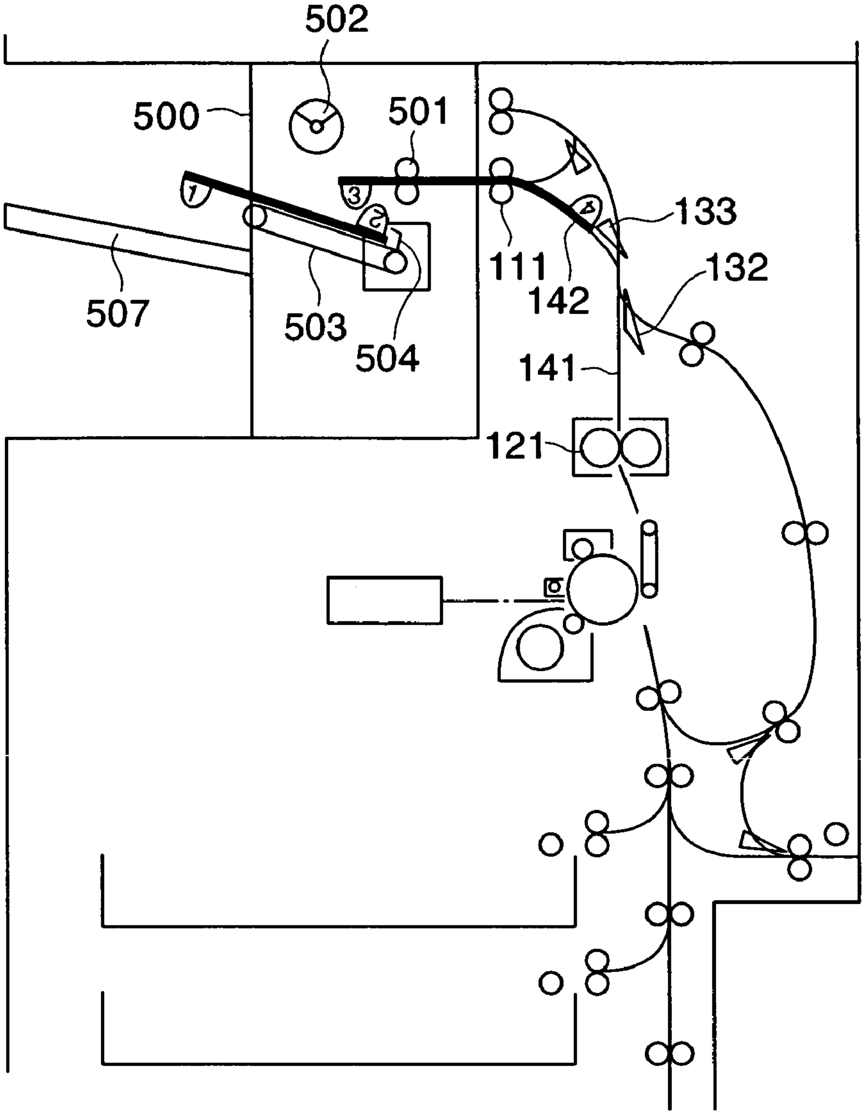

Moreover, the sheet discharged from the printer 100, when sent to the finisher 500, is discharged onto a bundle discharge belt 503 by a discharge roller 501 inside the finisher 500 (FIG. 3F, FIG. 3G). Specifically, an intermediate processing tray, not shown, is provided at a position several millimeters higher than the height of the bundle discharge belt 503 and extends in a direction perpendicular to the surface of the sheet on which the diagrams are drawn, with the sheet being discharged onto this intermediate processing tray.

The discharged sheet falls by gravity in the lower right direction of the diagram, along the intermediate processing tray (not shown) in a low-frictional state, provided above and parallel to the bundle discharge belt 503, and the bundle discharge belt 503. Further, an arc-shaped return roller 502 rotates counter-clockwise, which causes a friction member provided on the arcuate outer periphery of the return roller 502 to contact the sheet so as to assist the sheet in dropping in the lower right direction in the diagram, where the edge of the sheet abuts on a stopper plate 504. Thus, an operation for aligning the edges of the sheets in a vertical direction (that is, a forward direction) is accomplished.

Moreover, alignment plates 506 are provided on front and rear sides of the intermediate processing tray. The alignment plates 506 are activated each time a sheet is discharged onto the intermediate processing tray, thus aligning the edges of sheets discharged onto the intermediate processing tray in a horizontal (lateral) direction of the sheets.

Figure 4:
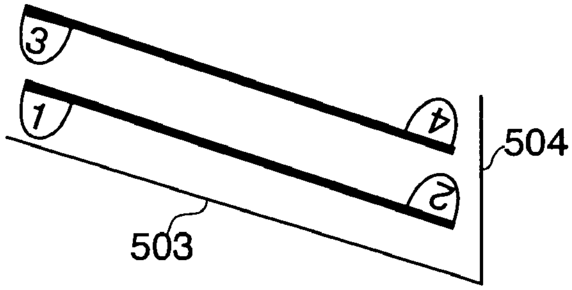
FIG. 4 is a diagram showing how sheets discharged onto an intermediate processing tray in the double-sided mode are stacked.

FIG. 4 is a diagram showing how sheets discharged onto the intermediate processing tray in the double-sided mode are stacked. When a predetermined number of sheets are discharged and stacked onto the intermediate processing tray, the bundle discharge belt 503 is activated so that the stacked sheets is discharged in a bundle onto a stack tray 507. At this time, if a stapling process is set, a bundle of sheets to be stapled is discharged onto the intermediate processing tray and the edges of the sheets are aligned by the alignment plates 506. Thereafter, a stapler 505 is activated to perform stapling, and the stapled bundle of sheets are then discharged onto the stack tray 507 by the bundle discharge belt 503. The stapler 505 is moveable in the transverse (width) direction relative to the bundle of sheets on the intermediate processing tray, to perform the stapling operation at a predetermined position in the above perpendicular direction.

Figure 5:
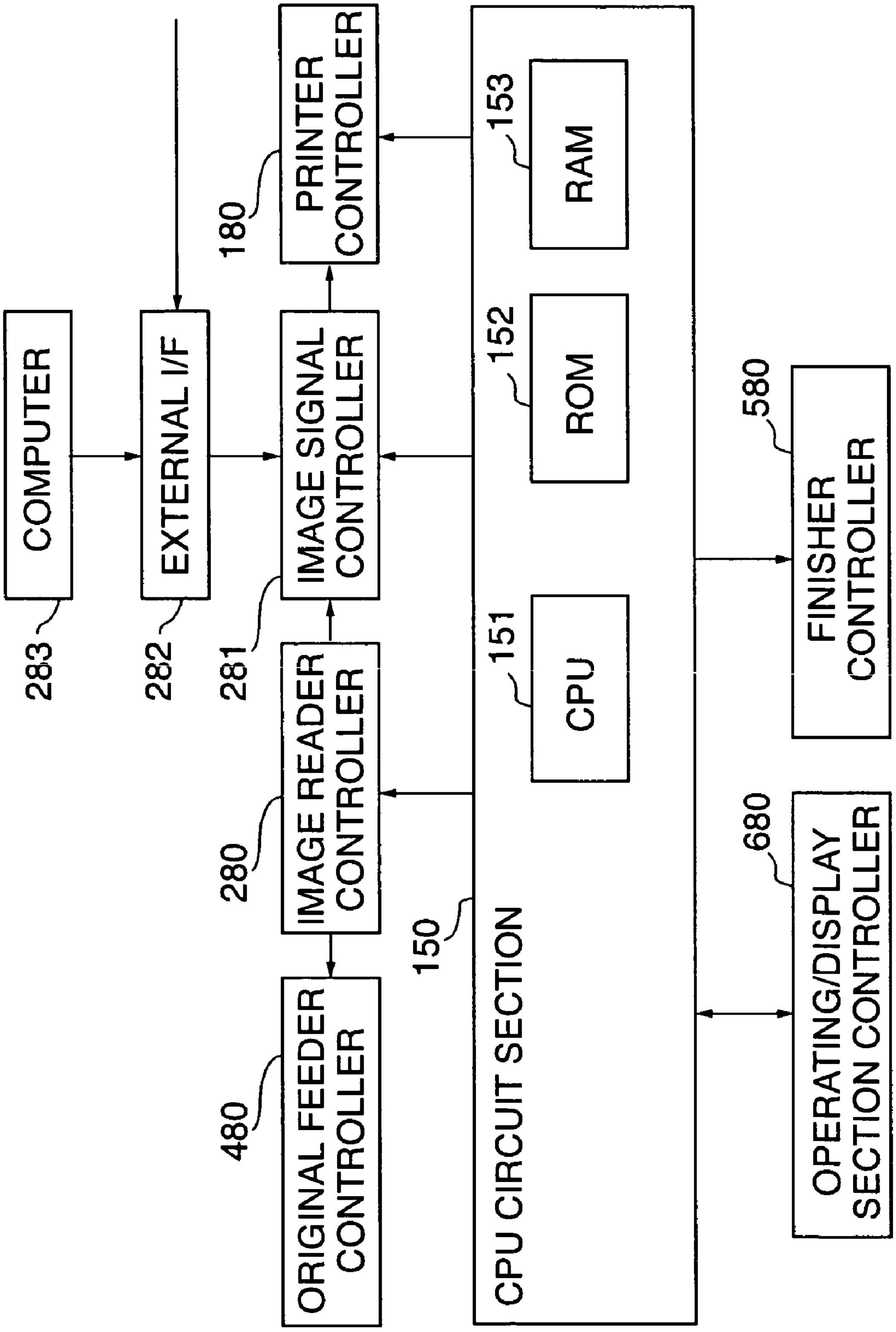
FIG. 5 is a block diagram showing the arrangement of a controller that controls the entire image forming apparatus.

FIG. 5 is a block diagram showing the arrangement of a controller that controls the entire image forming apparatus. The controller is comprised of a CPU circuit section 150, an original feeder controller 480, an image reader controller 280, an image signal controller 281, a printer controller 180, an operating/display section controller 680, and a finisher controller 580. An external computer 283 is connected to the image signal controller 281 through an external interface (I/F) 282.

The CPU circuit section 150 contains a CPU 151, a ROM 152 and a RAM 153. The CPU 151 executes control programs stored in the ROM 152 for centrally controlling all component parts of the image forming apparatus. The RAM 153 temporarily stores control data and is used as a work area for processing when the CPU 151 executes the control programs.

The original feeder controller 480 controls the original feeder 400 according to instructions from the CPU circuit section 150. The image reader controller 280 controls the scanner device 202, the image sensor 203, and so forth, and transfers an analog image signal output from the image sensor 203 to the image signal controller 281.

The image signal controller 281 converts the analog image signal from the image sensor 203 into a digital signal, executes various processing on the digital signal, and converts the digital signal on which the various processing were executed into a video signal and outputs the video signal to the printer controller 180. Moreover, the image signal controller 281 performs image rotation processing according to a set stapling position, described later. Moreover, the image signal controller 281 executes various processing on the digital image signal input from the computer 283 via the external I/F 282, converts the digital image signal on which the various processing were executed into a video signal and outputs the video signal to the printer controller 180. The operation of the image signal controller 281 is controlled by the CPU circuit section 150.

The operating/display section controller 680 exchanges information between an operating/display section 600 (see FIG. 6) and the CPU circuit section 150. The operating/display section 600, as described later, is comprised of a plurality of keys for setting a variety of functions relating to image formation, a display panel for displaying the status of these settings, and so forth. The operating/display section 600 outputs key signals corresponding to the operations of the keys to the CPU circuit section 150, and displays corresponding information based on signals from the CPU circuit section 150 on the display panel. The printer controller 180 drives the scanner device (exposure controller) 202 based on the input video signal.

Figure 6:
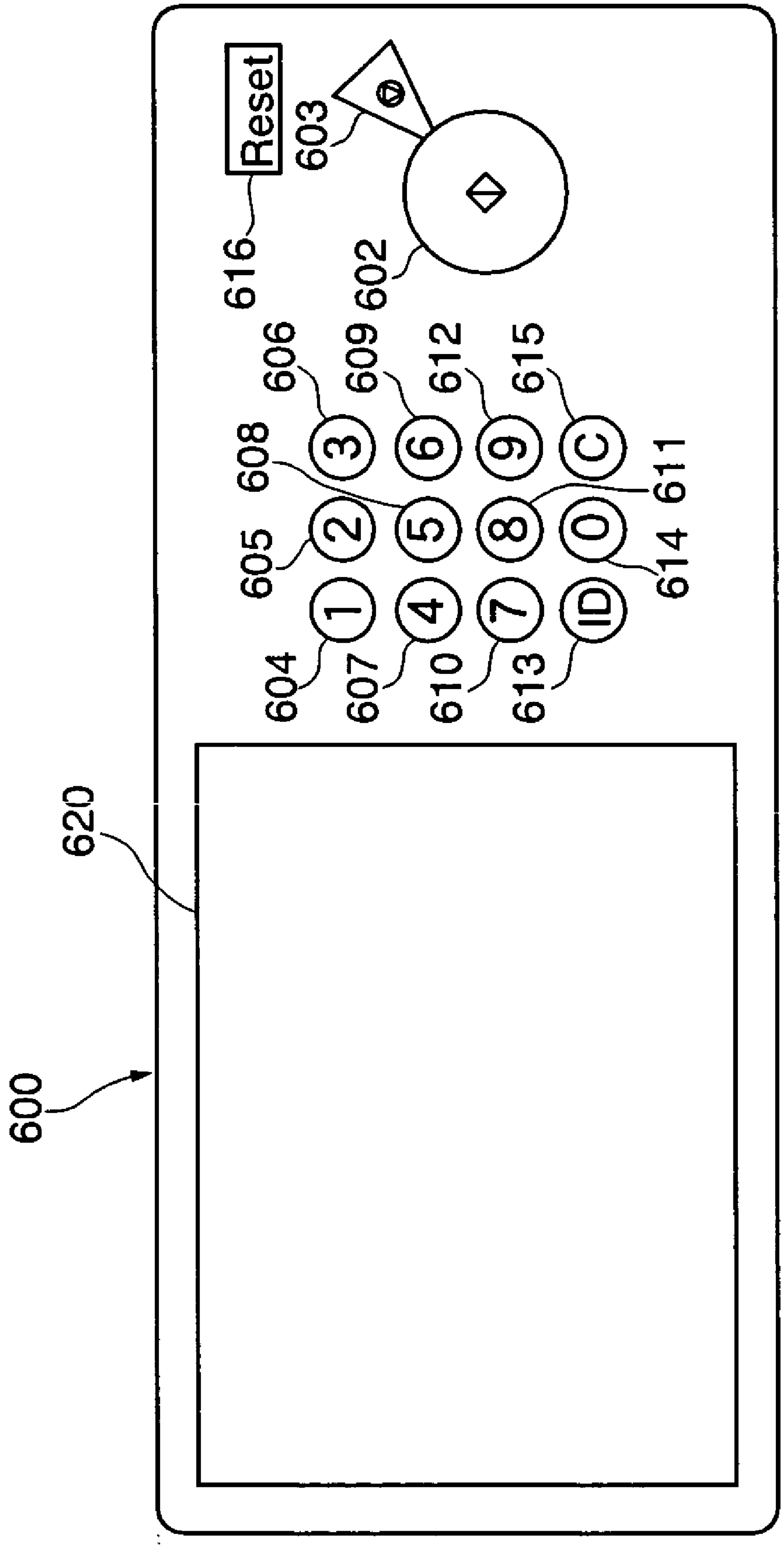
FIG. 6 is a diagram showing the appearance of an operating/display section of the image forming apparatus.

FIG. 6 is a diagram showing the appearance of the operating/display section 600 of the image forming apparatus. In the operating/display section 600, a start key 602 for instructing to start an image forming operation, a stop key 603 for instructing to interrupt the image forming operation, numeric keys 604 to 612, and 614 for entering numerical settings, an ID key 613, a clear key 615 and a reset key 616 are disposed.

Moreover, a liquid crystal display panel 620 on which is formed a touch panel is disposed on an upper portion of the operating/display section 600, with soft keys provided on the surface of the liquid crystal display panel 620. For example, the image forming apparatus according to the present embodiment has post-processing modes for the finisher 500 such as non-sort (group), sort, and stapling-sort (binding mode). These processing modes are set by input operations through the operating/display section 600.

Figure 7A:
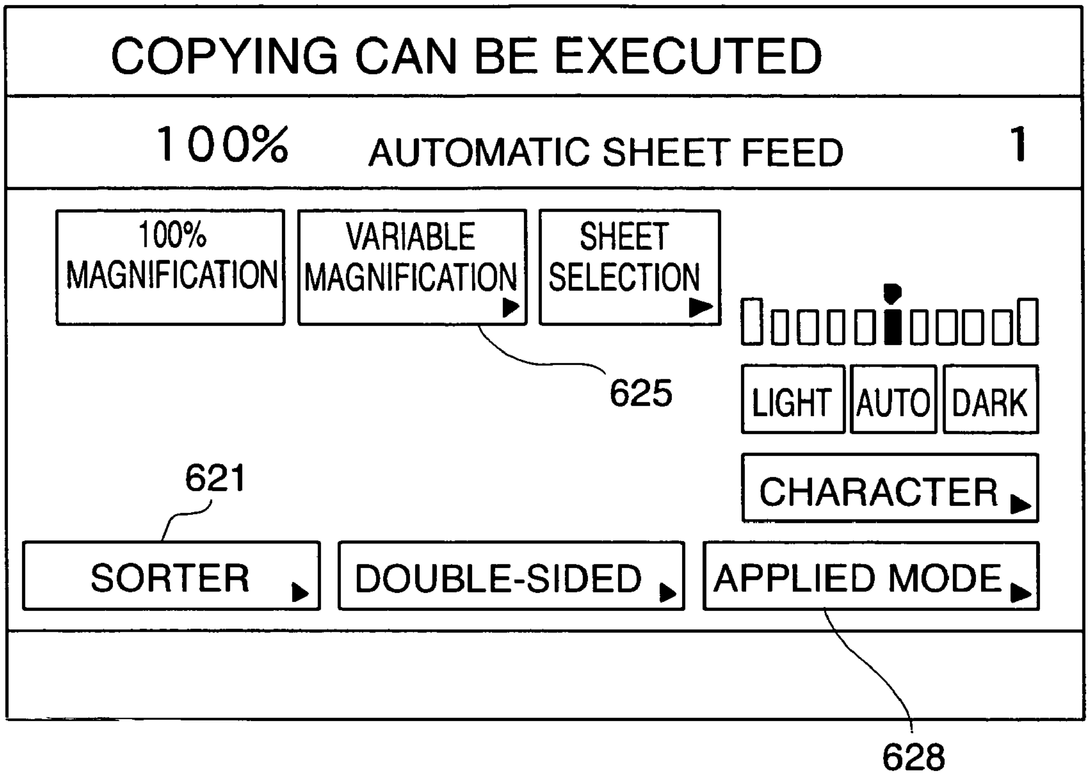
FIGS. 7A, 7B and 7C are diagrams showing soft keys arranged on a display panel of the operating/display section in FIG. 6.
Figure 7B:
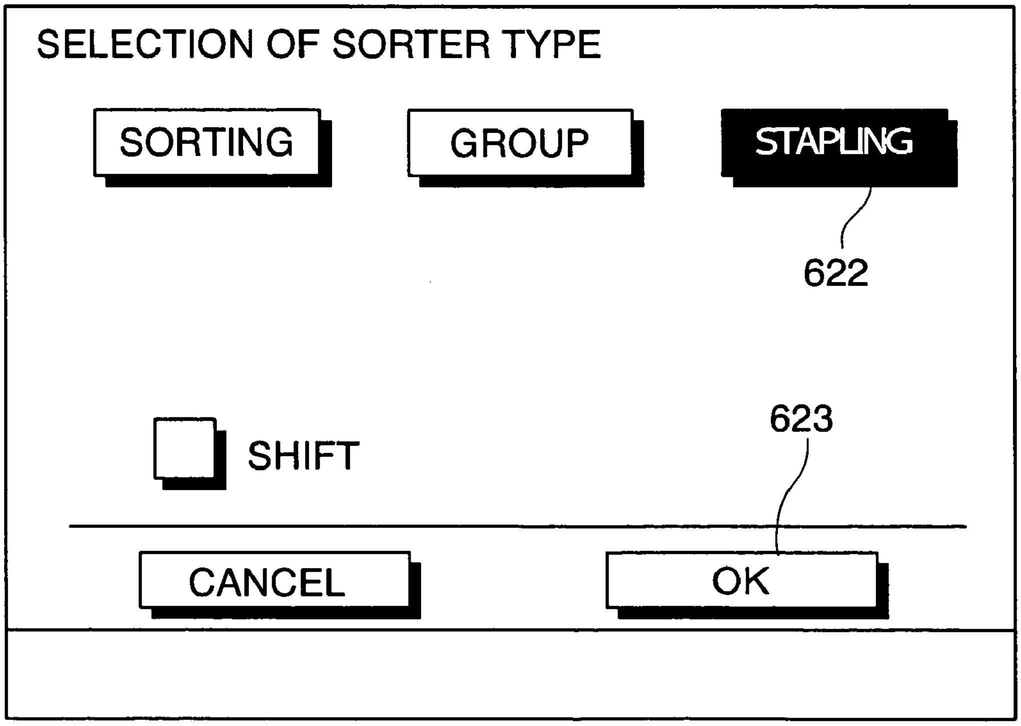
Figure 7C:
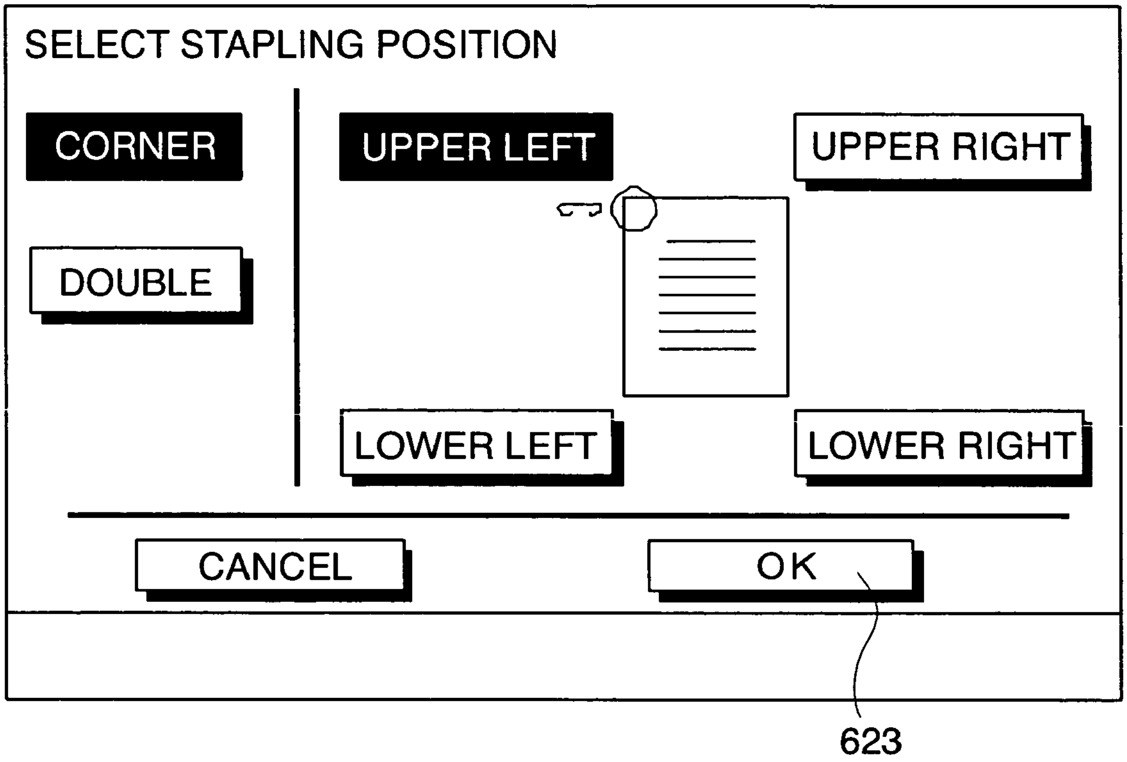

FIGS. 7A, 7B, and 7C are diagrams showing the soft keys arranged on the display panel of the operating/display section 600. When a sorter key 621, which is a soft key, is selected on the display panel 620 initial screen shown in FIG. 7A, a menu selection screen shown in FIG. 7B is displayed. On this menu selection screen, a processing mode is set. Moreover, when a stapling key 622, which is a soft key, is selected on the menu selection screen, a stapling position setting screen shown in FIG. 7C is displayed. Processing when the stapling key 622 is selected will be described later.

Figure 8A:
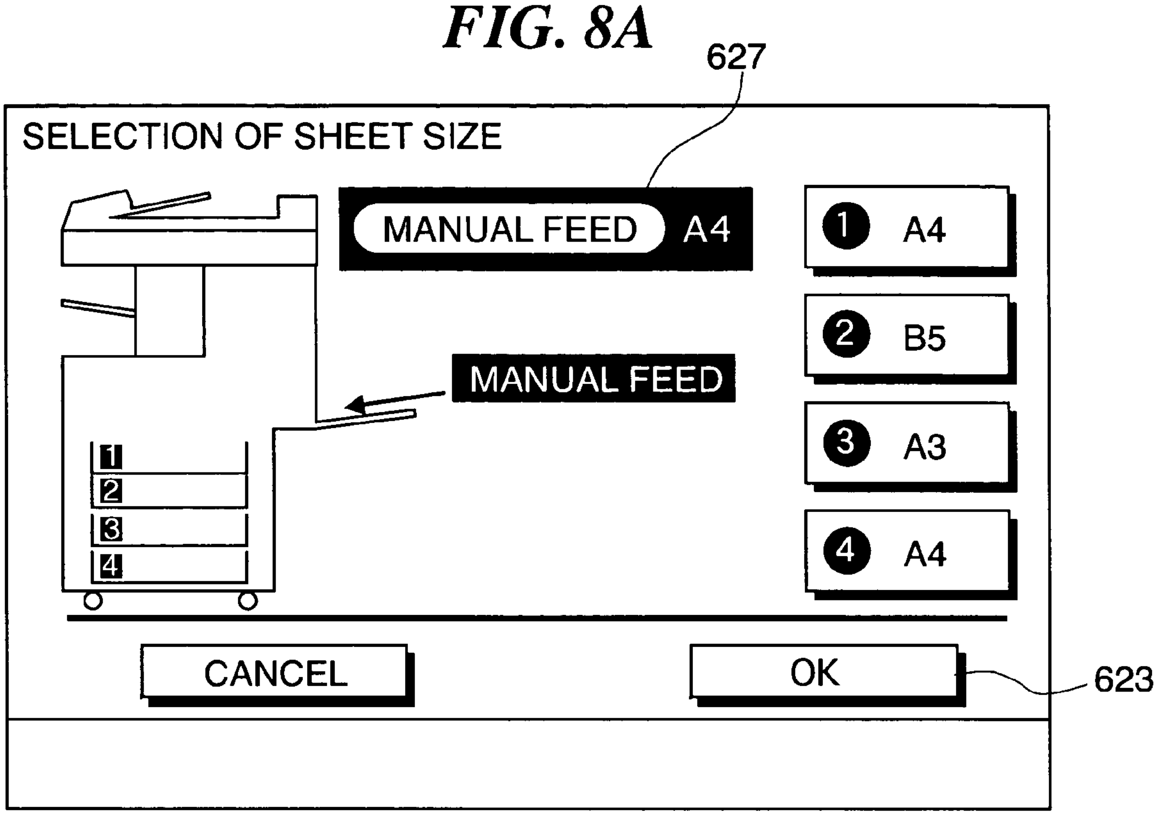
FIGS. 8A and 8B are diagrams showing setting keys for a manual feed mode on the display panel, and display states thereof.
Figure 8B:
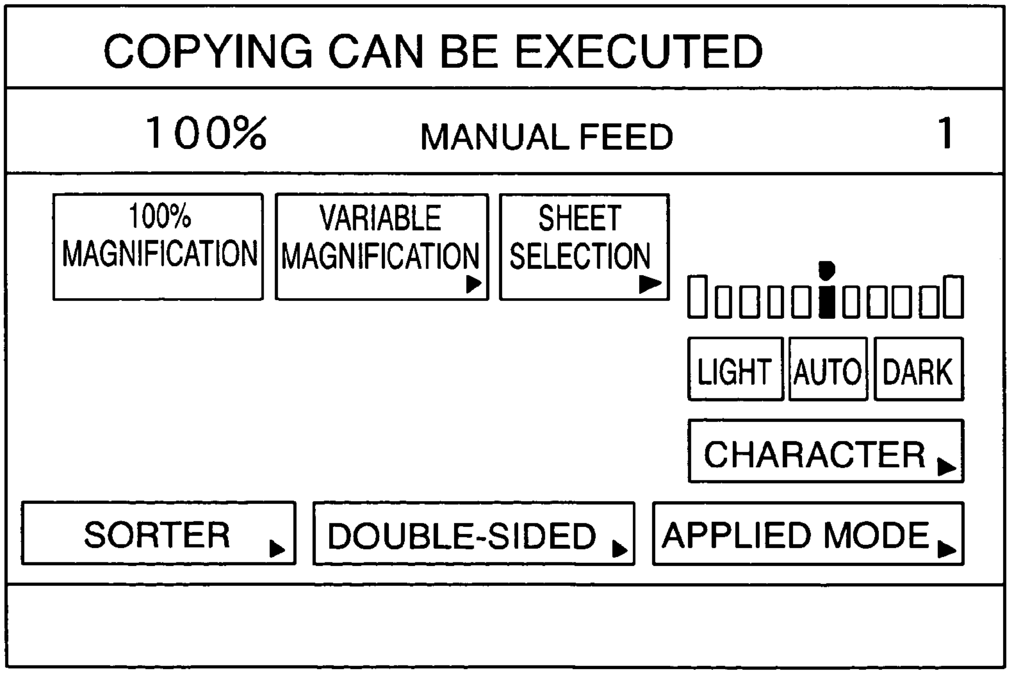
Figure 9A:
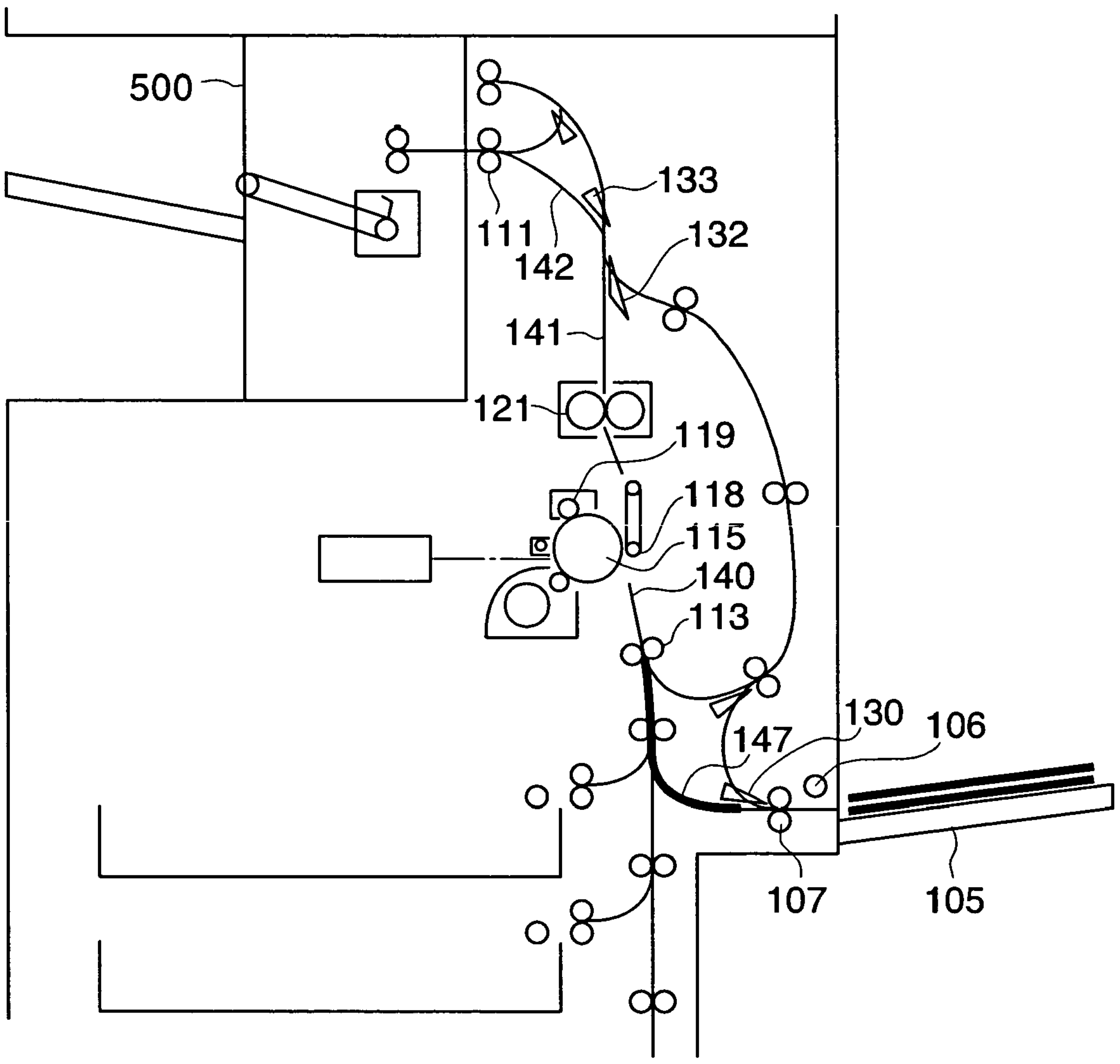
FIGS. 9A and 9B are diagrams useful in explaining a sheet conveying operation of the image forming apparatus in the manual feed mode.
Figure 9B:
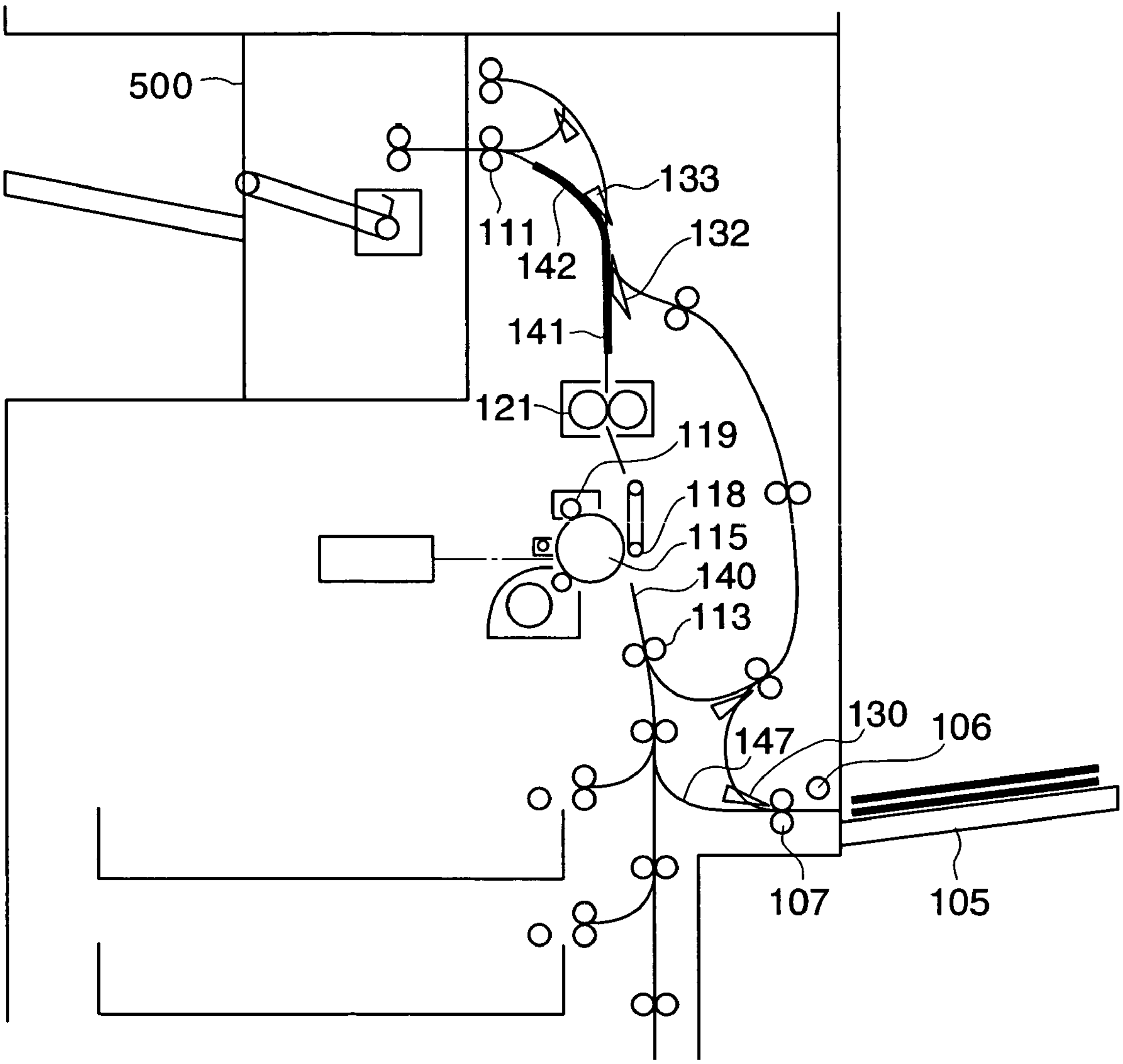

Next, a description will be given of a manual feed mode for forming an image on a sheet supplied from the manual feed tray 105. FIGS. 8A and 8B are diagrams showing setting keys for a manual feed mode on the display panel 620, and display states thereof. FIGS. 9A and 9B are diagrams useful in explaining a sheet conveying operation of the image forming apparatus in the manual feed mode.

In forming an image on a sheet set on the manual feed tray 105, when a sheet selection key 625, which is a soft key, is selected on the initial screen shown in FIG. 7A, the display panel 620 screen switches to a sheet selection screen shown in FIG. 8A. Sheet sizes set in the cassettes 101*a* to 101*d*, and the manual feed tray 105 are displayed on this sheet selection screen. If in this state the manual feed key 627 is selected and the OK key 623 is pressed, the display panel 620 returns to the initial screen shown in FIG. 8B to indicate that the manual feed tray is selected.

The operating/display section 600 numeric keys 604 to 612 (FIG. 6) are then selectively used to set numerical values, after which, when the start key 602 (FIG. 6) is pressed, an image forming operation is started. When a manual feed roller 106 (FIG. 9A) is brought into contact with a top sheet of a bundle of sheets stacked in the manual feed tray 105, and stacked sheets are conveyed into the interior of the printer 100 starting with the topmost sheet of the bundle of sheets, only the topmost single sheet is separated from the stacked sheets and conveyed by a pair of manual feed separation rollers 107. As shown in FIG. 9A, a flapper 130 is provided downstream of the pair of manual feed separation rollers 107, and as shown in FIG. 9A, the sheet is guided to the conveying path 147 by the flapper 130 until the leading edge of the sheet collides with the resist roller 113.

Thereafter, as shown in FIG. 9B, as is the case with the image forming operation described above, the sheet is conveyed from the transfer device 118 to the fixing device 121, guided to the conveying path 142 by the flapper 133, and discharged from the printer 100 toward the external finisher 500 via the discharge roller 111.

Next, a description will be given of a cover sheet/interleaved sheet mode of the image forming apparatus. FIGS. 10A, 10B, 10C, 10D, and 10E are diagrams showing setting keys for the cover sheet/interleaved sheet mode on the display panel, and display states thereof. When an application mode key 628, which is a soft key, is selected on the initial screen shown in FIG. 7A, the display panel 620 switches to a screen for selecting various modes shown in FIG. 10A. Here, when a cover sheet/insert key 635 is selected, the display panel 620 switches to a screen, shown in FIG. 10B, that enables a user to select either the cover sheet mode or the interleaved sheet mode.

Figure 11A:
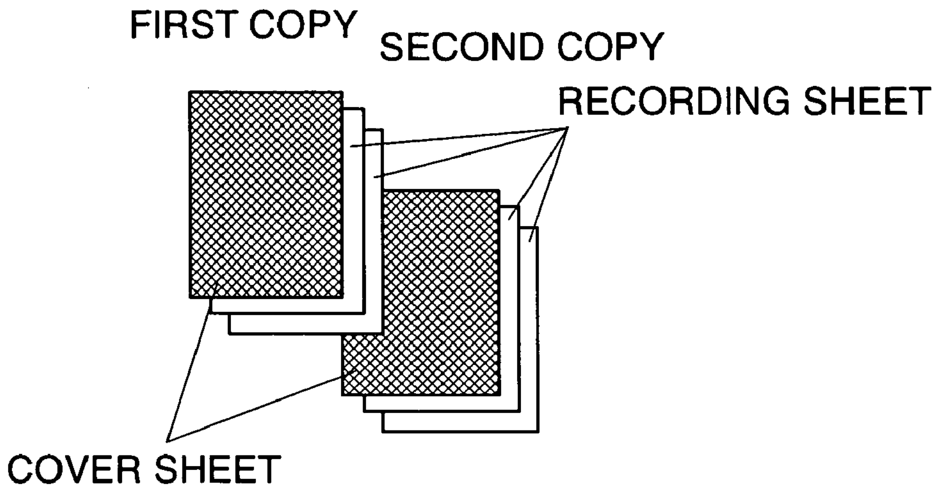
FIGS. 11A and 11B are diagrams illustrating the cover sheet mode and the interleaved sheet mode.
Figure 11B:
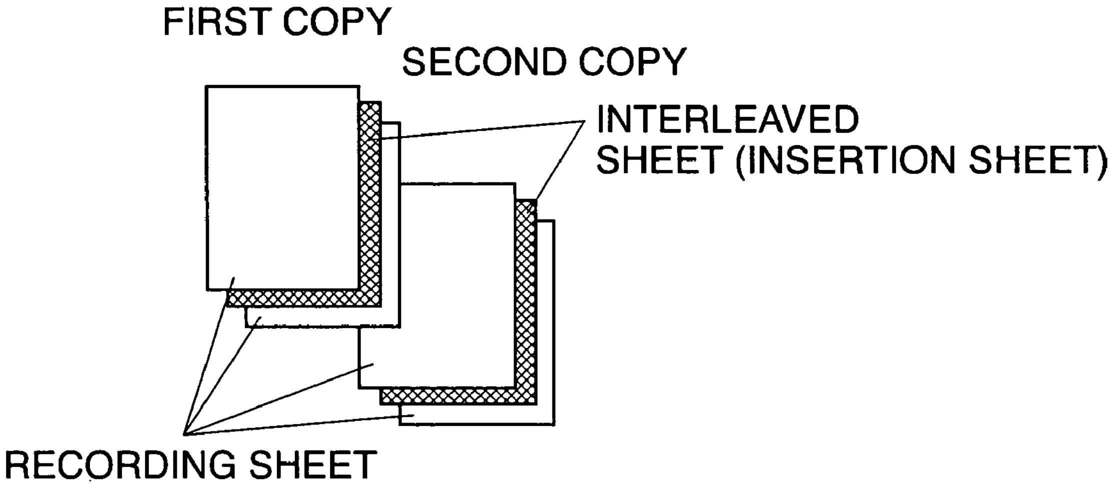

FIGS. 11A and 11B are diagrams illustrating the cover sheet mode and the interleaved sheet mode. The cover sheet mode, as shown in FIG. 11A, inserts a specific sheet at the front of each bundle of stacked sheets. By contrast, the insertion sheet mode, as shown in FIG. 11B, a mode in which a specific sheet is inserted in a bundle of stacked sheets at an arbitrary page location thereof. The interleaved sheet mode is used, for example, to insert a previously color-output sheet by an image forming apparatus into a bundle of recording sheets output from a black-and-white image forming apparatus.

Figure 10A:
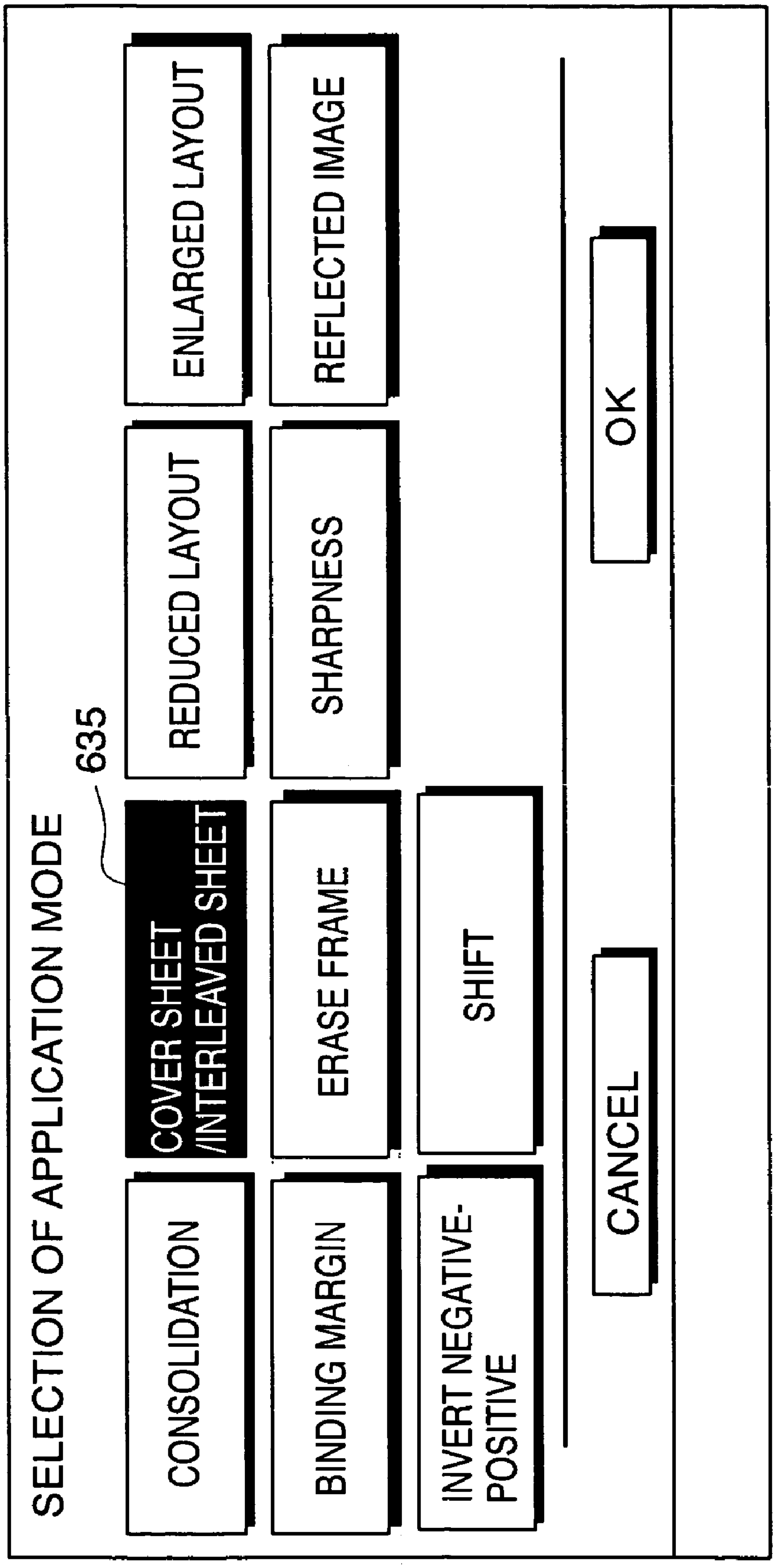
FIGS. 10A, 10B, 10C, 10D and 10E are diagrams showing setting keys for a cover sheet/interleaved sheet mode on the display panel, and display states thereof.
Figure 10B:
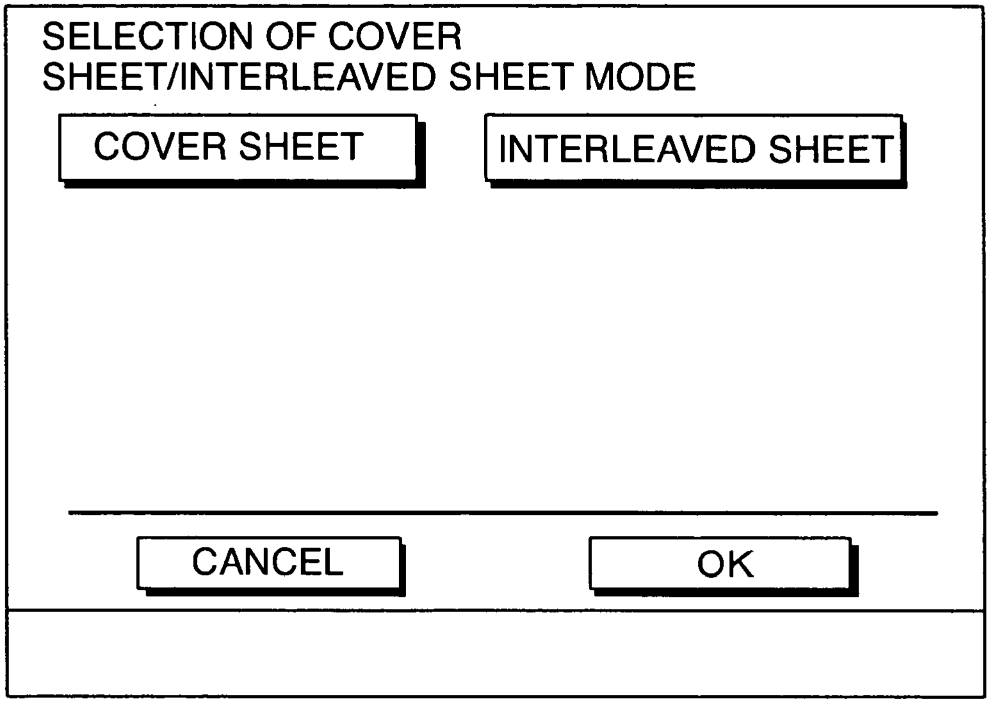
Figure 10C:
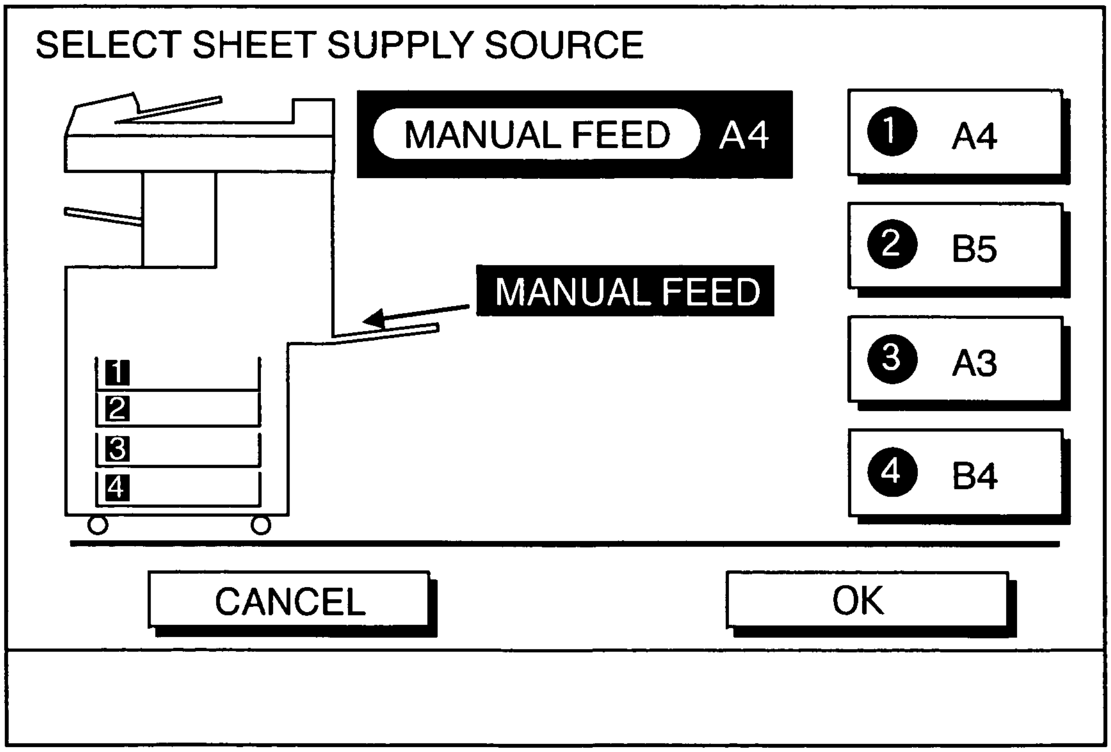

When the cover sheet mode is selected on the screen shown in FIG. 10B, the display panel 620 switches to a screen for selecting a supply source for a sheet to be inserted (FIG. 10C). After the selection, the display panel 620 returns to the initial screen (FIG. 10D).

Figure 10D:
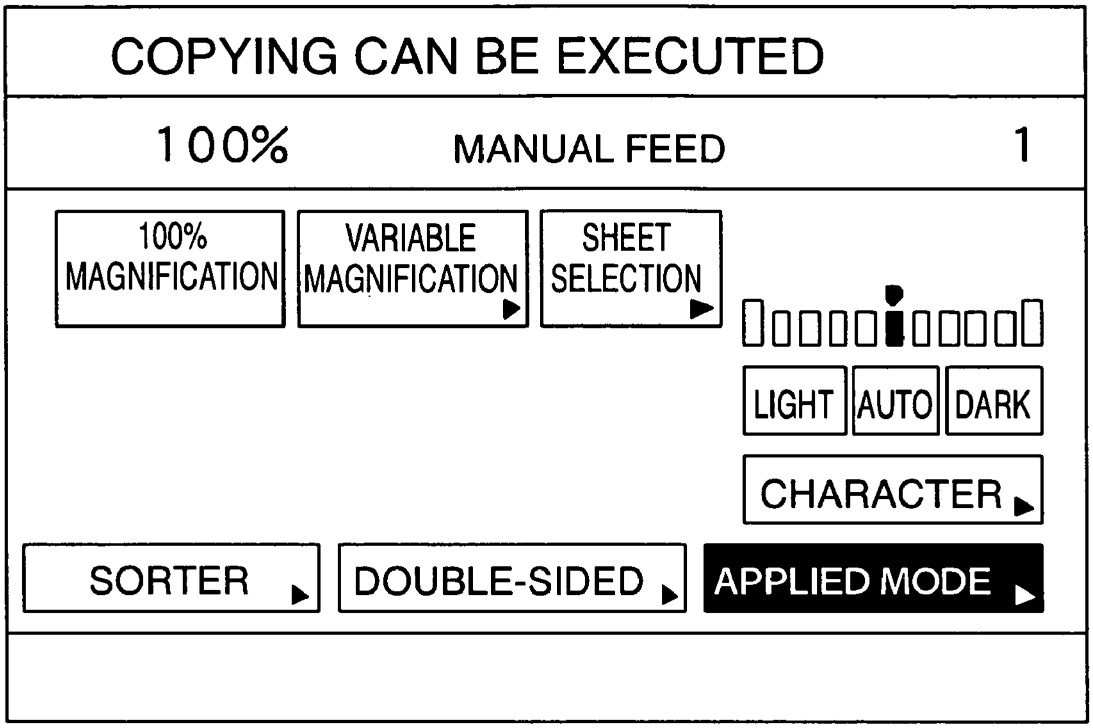
Figure 10E:
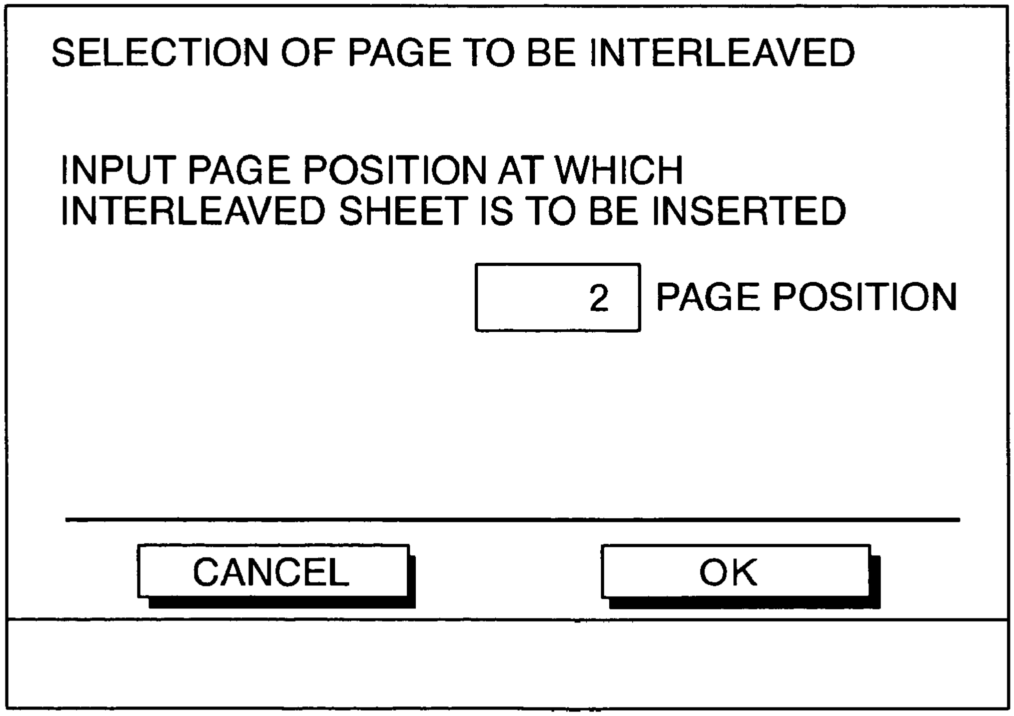

On the other hand, when the interleaved sheet mode is selected, to set a page position, within the bundle of sheets, at which an interleaved sheet is to be inserted, the display panel 620 switches to the insert page selection screen shown in FIG. 10E. When there is input from any of the numeric keys 604 to 612 and the OK key 623 is pressed on the interleaved page selection screen, the display panel 620 switches to a screen for selecting a supply source for a sheet to be inserted (cassettes 101*a* to 101*d*, or the manual feed tray 105) (FIG. 10C).

After the selection, the display panel 620 returns to the initial screen (FIG. 10D). In the present embodiment, as shown in FIGS. 10C and 10D, the interleaved or insertion sheet is supplied from sheets set on the manual feed tray 105, and therefore the display panel 620 indicates that the manual feed tray 105 is selected. If a cassette is selected in FIG. 10C, the selected cassette is displayed.

FIGS. 12A, 12B, 12C, 12D, and 12E are diagrams useful in explaining a sheet conveying operation of the image forming apparatus in the interleaved sheet mode. FIGS. 12A to 12E illustrate an example in which an image is formed on a sheet supplied from the cassette 101*a* as the first page, a sheet supplied from the manual feed tray 105 is inserted as the second page, and a sheet supplied from the cassette 101*a* is inserted as the third page and on which an image is formed.

Figure 12A:
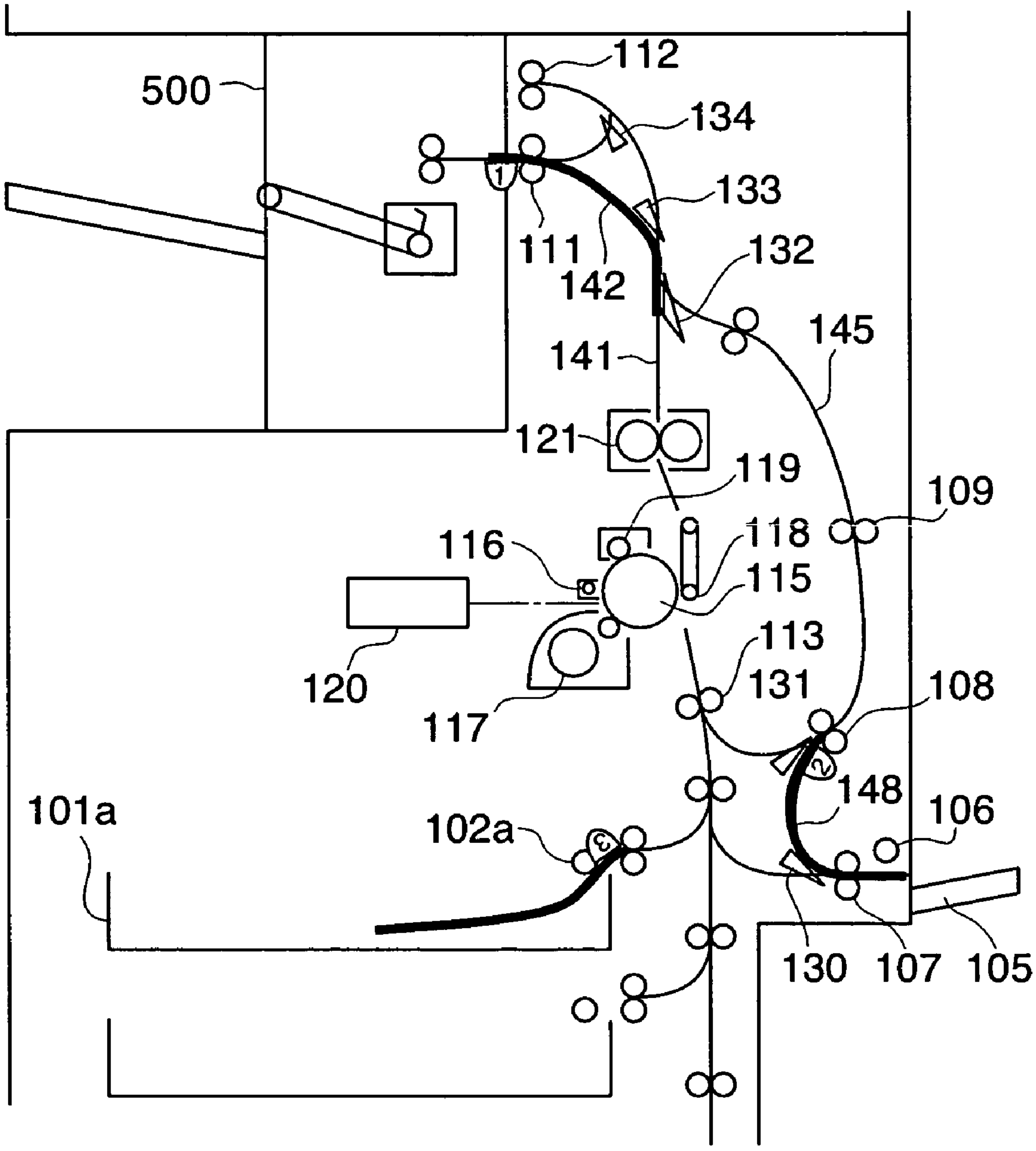
FIGS. 12A, 12B, 12C, 12D and 12E are diagrams useful in explaining a sheet conveying operation of the image forming apparatus in the interleaved sheet mode.

The sheet as the first page conveyed from the cassette 101*a* by a feed roller 102*a* is conveyed to the resist roller 113, then conveyed from the transfer device 118 to the fixing device 121, and then guided to the conveying path 142 by the flapper 133. At the same time, the sheet to be inserted at the second page as an interleaved sheet is the topmost sheet of a bundle of sheets stacked face up on the manual feed tray 105, and is conveyed into the printer 100 by the manual feed roller 106 and the pair of manual feed separation rollers 107, guided to the conveying path 148 by the flapper 130, and further conveyed until the leading edge of the sheet collides with a pair of double-sided conveying rollers (insert resist rollers) 108. The pair of double-sided conveying rollers 108 has the same function as the resist roller 113, and can correct skewing of the sheet supplied from the manual feed tray 105 (FIG. 12A).

Figure 12B:
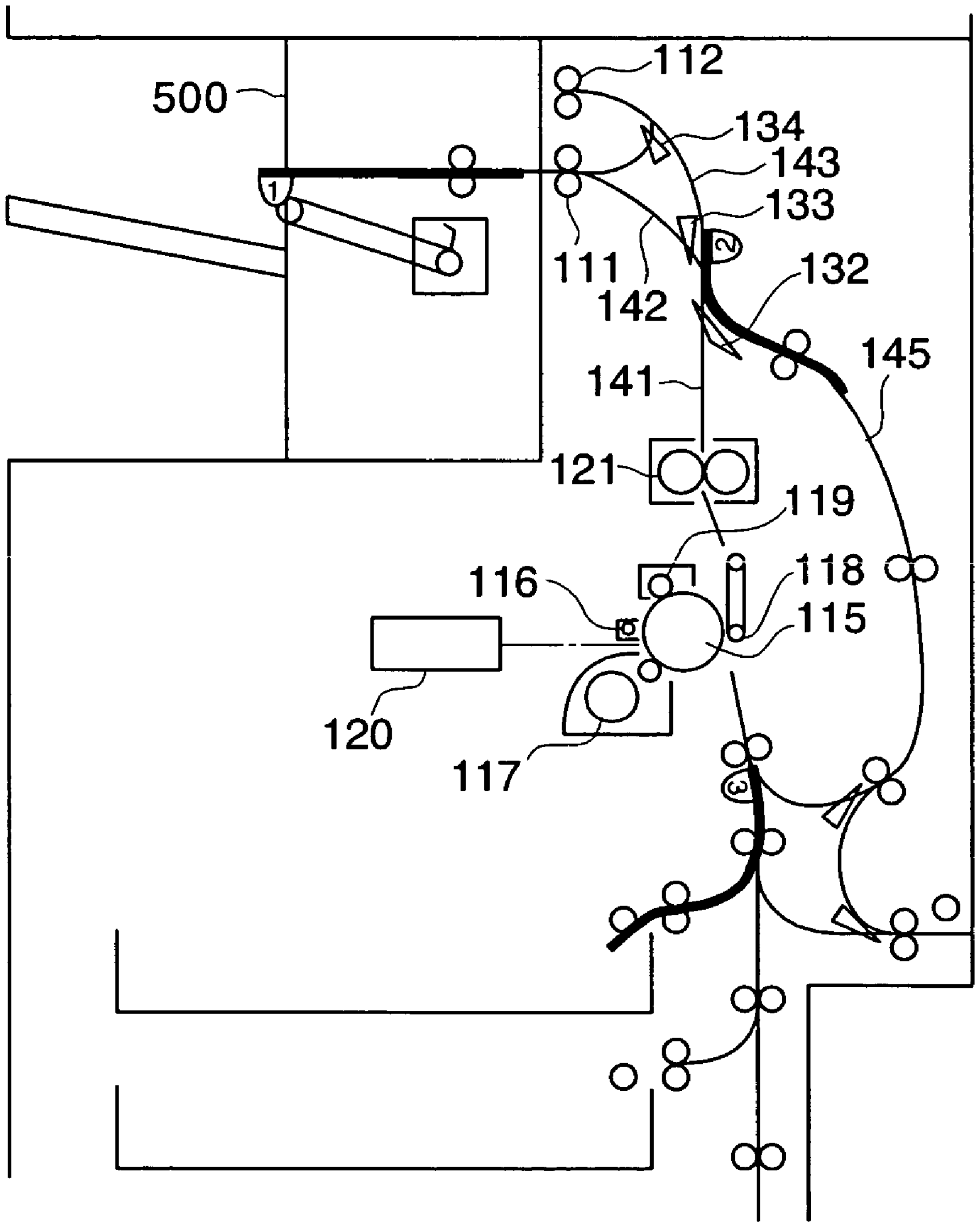

Thereafter, the sheet as the first page, on which an image has been formed is conveyed from the printer 100 to the finisher 500 by the discharge roller 111. The insertion sheet as the second page is then guided to the conveying path 143 from the double-sided conveying path 145 by the flapper 133. In this way, the insertion sheet as the second page is conveyed to the finisher 500 without passing through the photosensitive drum 115 and the fixing device 121. Moreover, a sheet as the third page, which is supplied from the cassette 111*a*, and on which an image is to be formed next, like the first page sheet, is conveyed to the resist roller 113 (FIG. 12B).

Figure 12C:
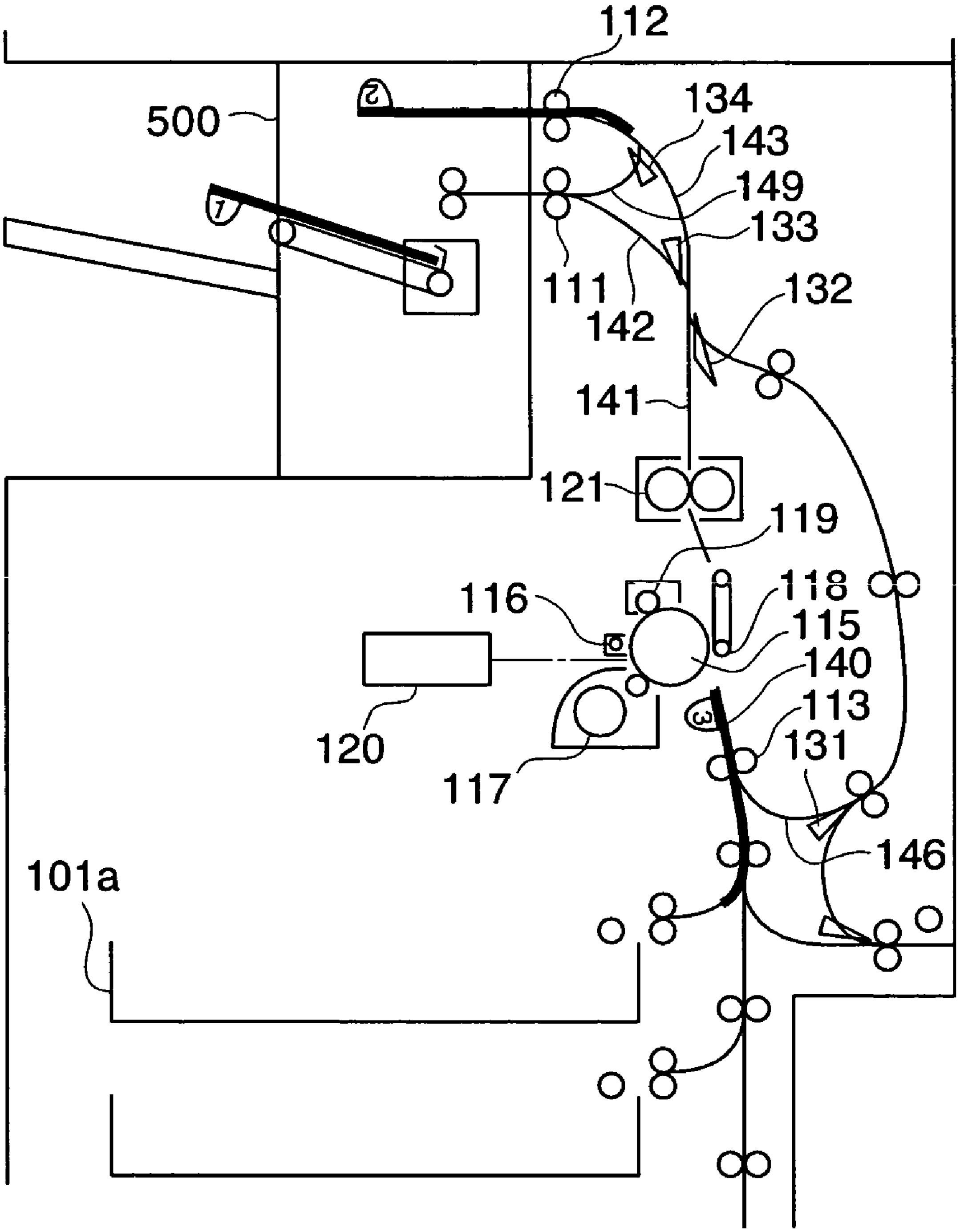
Figure 12D:
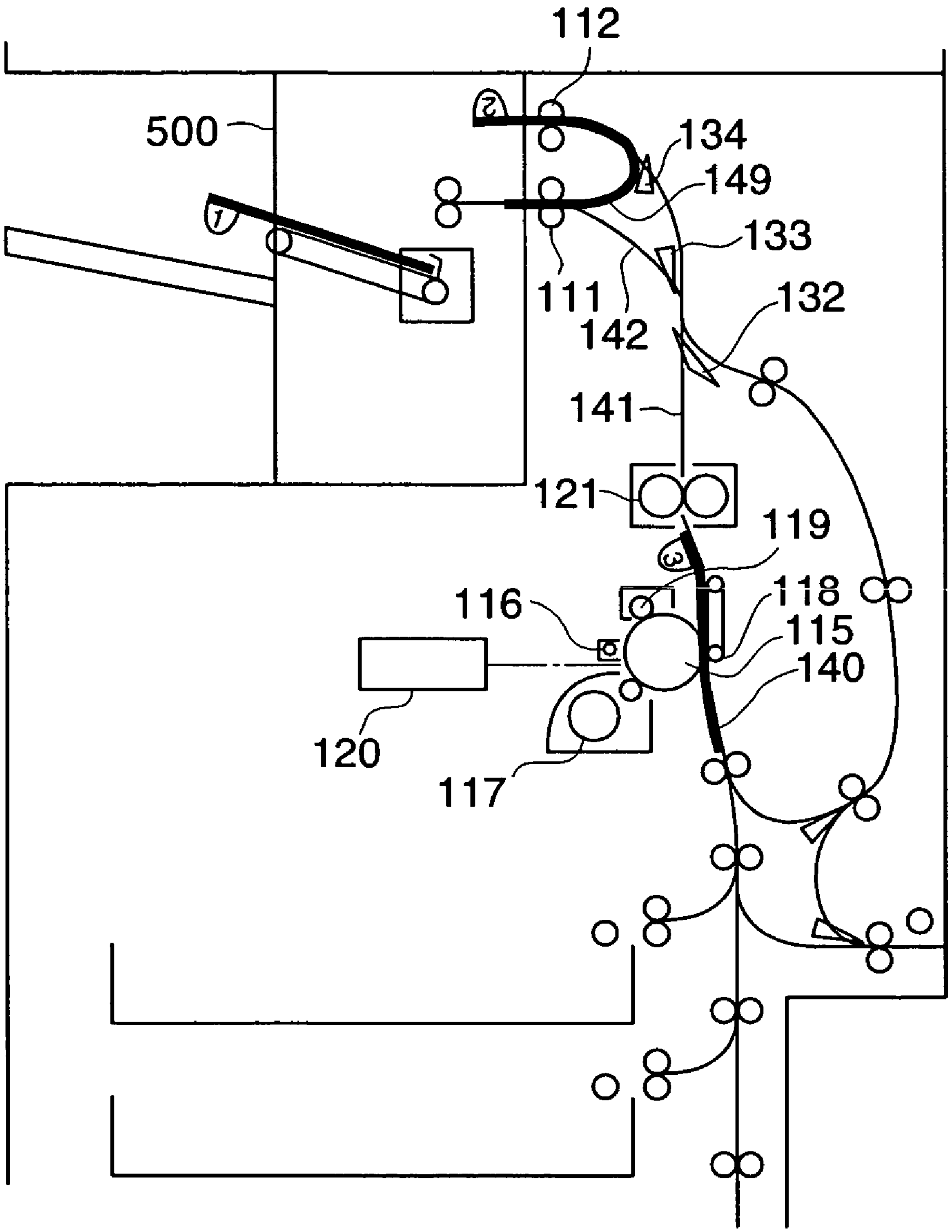

After the first page sheet is discharged onto the intermediate processing tray inside the finisher 500, the second page insertion sheet is conveyed to the conveying path 143. Once the trailing edge of the insertion sheet passes a flapper 134, the sheet is stopped with the leading edge of the sheet being inserted into the nip of the inverting roller 112 (FIG. 12C). When the flapper 134 is switched and the inverting roller 112 is driven in reverse, the sheet is guided from the conveying path 143 to an inverting path 149, and then the sheet is conveyed from the printer 100 toward the finisher 500 by the discharge roller 111 (FIG. 12D).

Figure 12E:
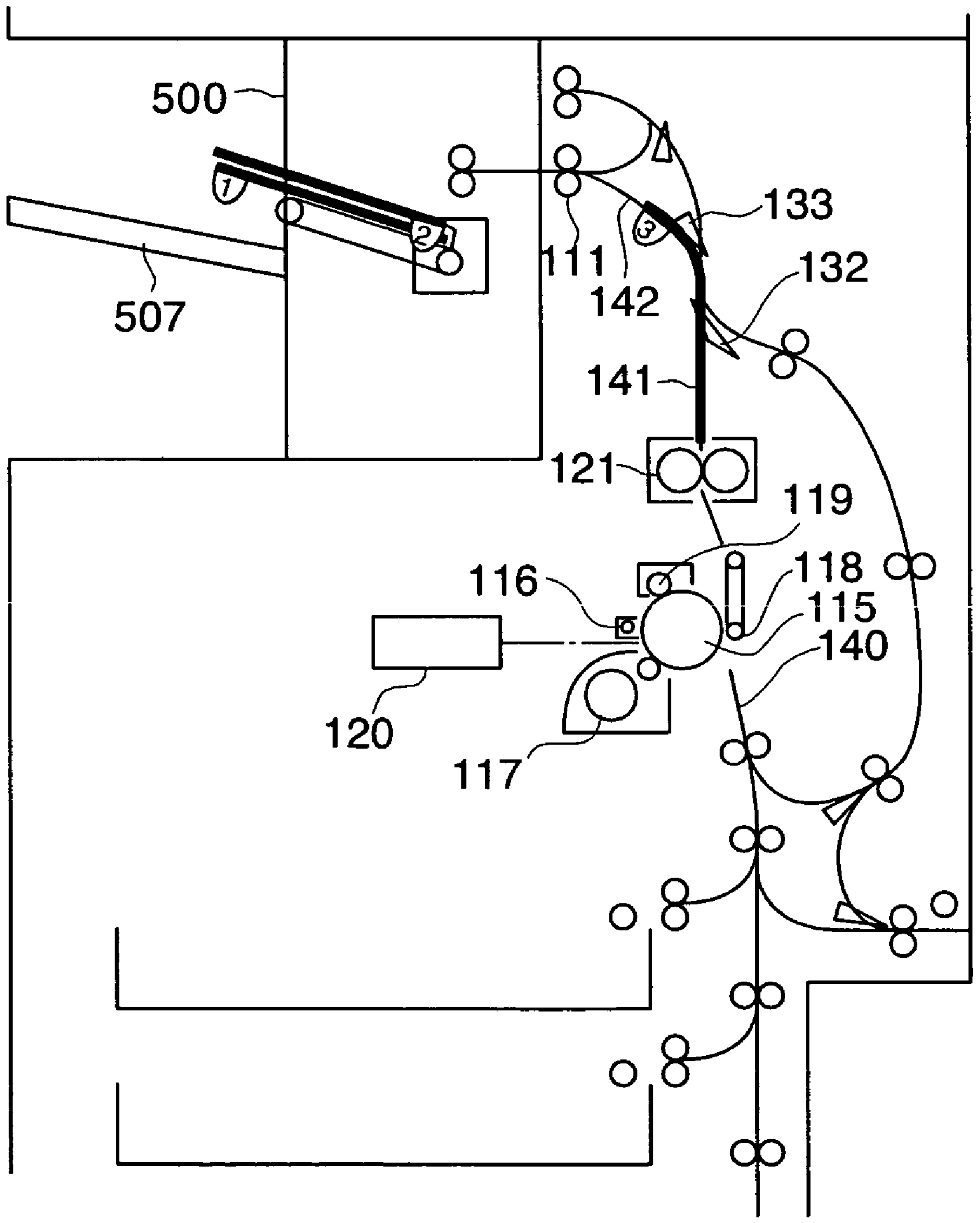

Then, the second page insertion sheet conveyed to the finisher 500 as described above is placed onto the first page sheet on the intermediate processing tray (FIG. 12E). Meanwhile, at this time, the third page sheet on which an image is to be formed next passes from the resist roller 113 through the transfer device 118 and the fixing device 121. The first page sheet and the third sheet, on each of which an image has been formed, are then discharged face down, that is, the image-formed surfaces thereof facing downward, to the intermediate processing tray of the finisher 500. Moreover, the inserted second page insertion sheet, though placed face up on the manual feed tray 105, is discharged onto the intermediate processing tray face down. Thus, the sheets are put into the correct page order. Thereafter, the bundle of sheets is discharged from the intermediate processing tray to the stack tray 507.

In the above-described way, sheet conveyance in the interleaved sheet mode is carried out. Also in the cover sheet mode, sheet are conveyed along the same conveying path as the interleaved sheet mode, and the pages are put in the correct page order.

Next, a description will be given of a case in which one of the cassettes 101*a*-101*d* is specified as the sheet supply source. It is assumed, for example, that a bundle of insertion sheets is stacked in the cassette 101*a* and bundles of sheets on which images are to be formed are placed in the remaining cassettes 101*b*-101*d*, and sheets for first and second pages have already been conveyed from selected ones of the cassettes 101*b*-101*d*.

The third page sheet (that is, the insertion sheet) that is conveyed from the cassette 101*a* by the feed roller 102*a*, is then conveyed to the resist roller 113, and conveyed from the transfer device 118 to the fixing device 121, guided to the conveying path 142 by the flapper 133, and discharged from the printer 100 to the finisher 500 via the discharge roller 111. However, because the sheet is an insertion sheet in the cover sheet/interleaved sheet mode, the sheet is sent from the transfer device 118 to the fixing device 121 without a developed image being formed on the photosensitive drum 115 and without an image being transferred onto the sheet.

Next, a description will be given of the stapling mode of the image forming apparatus. FIGS. 13A, 13B, 13C and 13D are diagrams showing directions of placement of a cover sheet or an insertion sheet on the manual feed tray 105, as displayed on the display panel 620.

The stapling mode is set by an input operation via the operating/display section 600. When the sorter key 621 gas selected on the initial screen shown in FIG. 7A, the menu selection screen shown in FIG. 7B is displayed on the display panel 620. In FIG. 7B, when the stapling key 622 is selected and the OK key 623 is pressed, a screen for setting the stapling position is displayed as shown in FIG. 7C. This screen is used to select the position on the sheet (that is, a position relative to the image) at which stapling is to be carried out. After the position is selected and the OK key 623 is pressed, the stapling mode for stapling together an output bundle of sheets is set and the display panel 620 returns to the initial screen shown in FIG. 7A.

Since the finisher 500 of the present embodiment is capable of only stapling the trailing edge of the bundle of sheets in the conveying direction, that is, the left or right lateral sides of the sheet bundle, then the image signal controller 281 rotates the images to enable the bundle of sheets to be stapled at the desired position.

Figure 14:
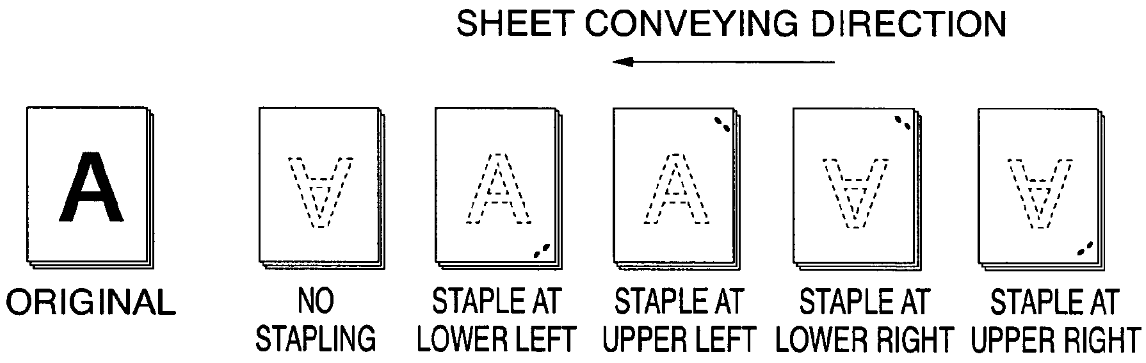
FIG. 14 is a diagram showing the relationship between stapling positions and image rotations.

FIG. 14 is a plan view showing stapled sheets on which images are formed. When, for example, as shown in FIG. 14, the upper left or the lower left of a discharged bundle of sheets is selected as a position at which the bundle of sheets are to be stapled together, each image is rotated through 180 degrees compared to a case in which stapling is not selected. By contrast, when the upper right or the lower right of the sheet bundle is selected as a position for stapling, the image is not rotated. It is assumed here that the image forming apparatus is configured such that images are formed as shown in a “no stapling” state shown in FIG. 14 if stapling is not designated, without the image signal controller 281 rotating the image (zero rotation processing). If the image forming apparatus is configured such that the image signal controller 281 does rotate the image and images are formed in the “no staple” state shown in FIG. 14, when either the upper left or the lower left of the sheet bundle is selected as the stapling position, the image signal controller 281 does not rotate the image; when either the upper right or the lower right is selected as the stapling position, the image signal controller 281 rotates the image through 180 degrees. In other words, when the upper left or the lower left is selected as the stapling position for a discharged bundle of sheets, the image is formed on the sheet in such a way that a top edge of the image is disposed toward a distal end of the image forming apparatus and a bottom edge of the image is disposed toward a proximal end of the image forming apparatus. By contrast, if the upper right or the lower right is selected as the stapling position, the image is formed on the sheet in such a way that the top edge of the image is disposed toward the proximal end of the apparatus and the bottom edge of the image is disposed toward the distal end of the apparatus.

A description will be now given of a process for setting a combination of the cover sheet/interleaved sheet mode and the stapling mode.

Figure 15:
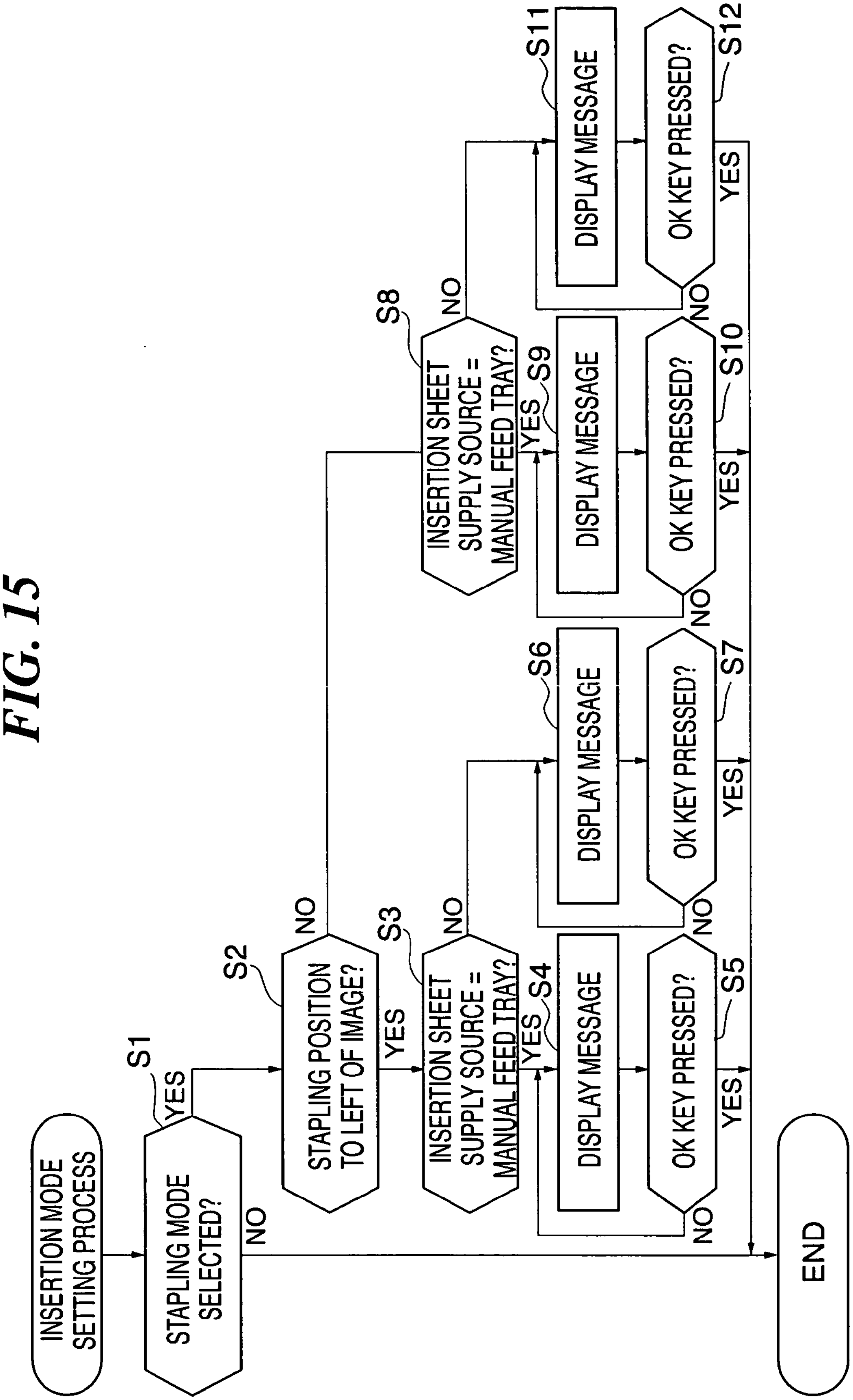
FIG. 15 is a flow chart showing an insertion sheet mode setting process when selecting the cover sheet/interleaved sheet mode.

FIG. 15 is a flow chart showing an insertion sheet mode setting process when selecting the cover sheet/interleaved sheet mode. A program for implementing this process is stored in the ROM 152 of the CPU circuit section 150, and is executed by the CPU 151 each time the cover sheet/interleaved sheet mode is selected.

First, it is determined whether or not the stapling mode has been already selected (step S1). If the stapling mode has not yet been selected, then the process is terminated. However, if the stapling mode has been already selected, then it is determined whether or not the stapling position is "upper left" or "lower left" (step S2). If the "upper left" or "lower left" is selected, then it is determined whether or not the manual feed tray 105 has been selected as the sheet supply source on the screen for setting the sheet supply source in FIG. 10C (step S3).

Figure 13A:
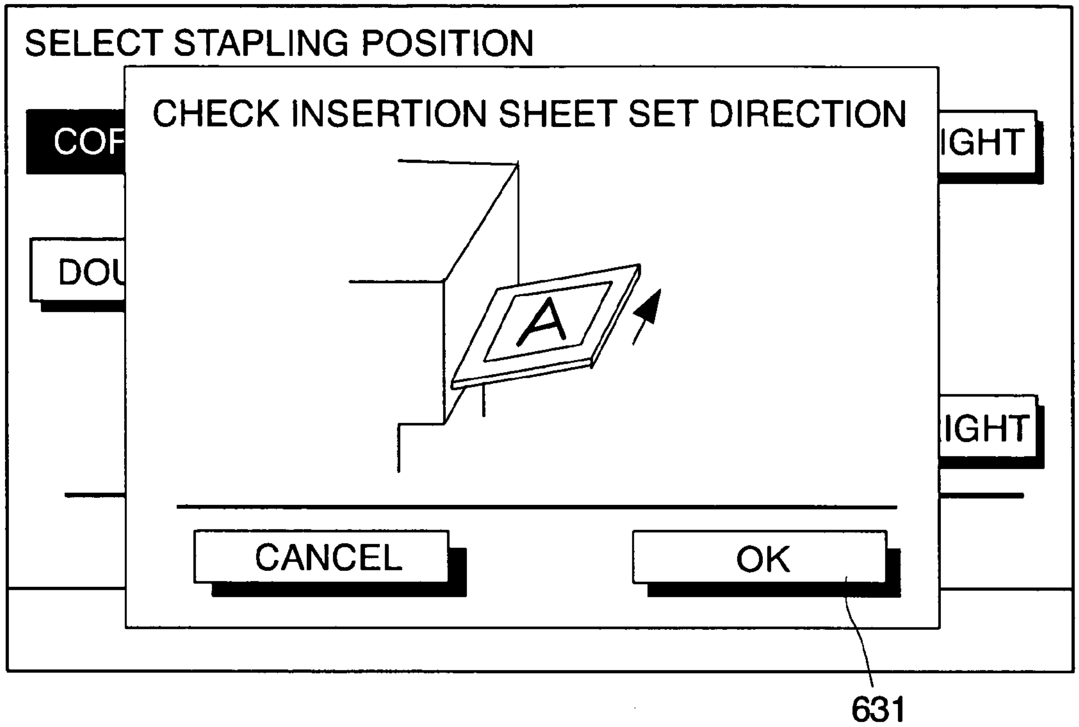
FIGS. 13A, 13B, 13C and 13D are diagrams showing directions of placement of a cover sheet or an insertion sheet on a manual feed tray, as displayed on the display panel.

If the manual feed tray 105 has been selected, then a screen showing an orientation of a sheet set on the manual feed tray 105, specifically the screen shown in FIG. 13A, is displayed on the display panel 620 (step S4). The screen shown in FIG. 13A instructs that an insertion sheet is to be placed with its top and bottom edges in a correct direction on the manual feed tray 105 (that is, the top edge of the image printed on the insertion sheet is to be disposed toward the distal end of the manual feed tray 105 of the apparatus as viewed in FIG. 1). Thereafter, the apparatus waits for the OK key 631 to be pressed (step S5). When the OK key 631 is pressed, the process for setting the cover sheet/interleaved sheet mode is finished.

Figure 13B:
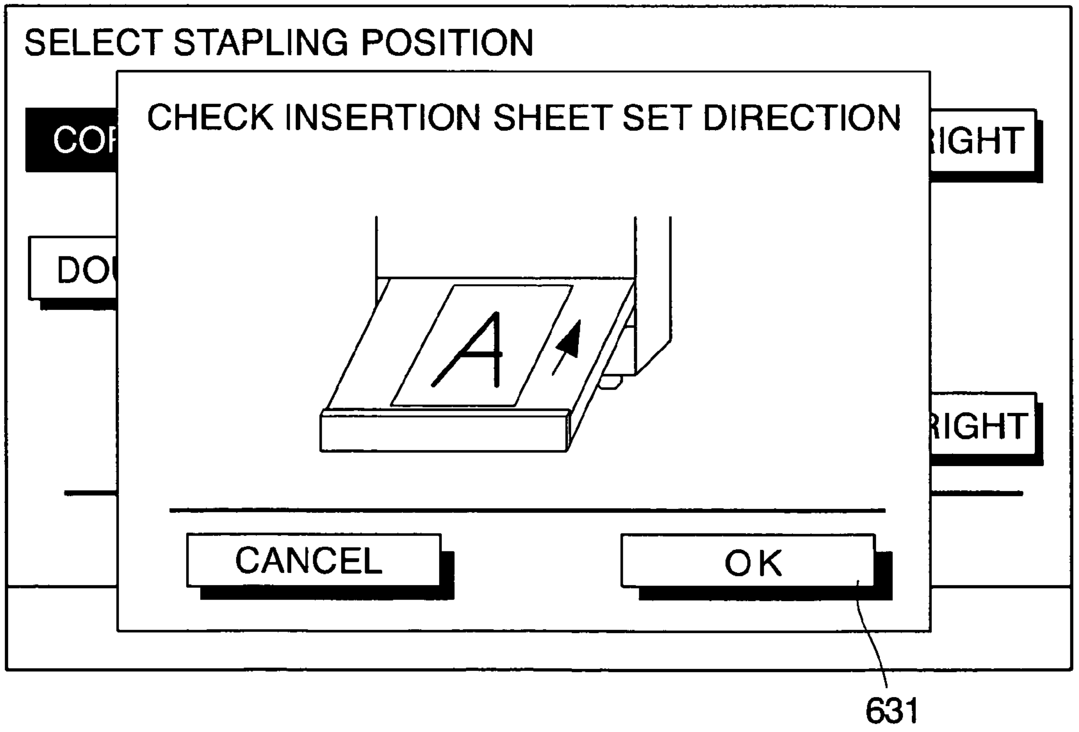

On the other hand, if in the step S3 the manual feed tray 105 has not been selected but one of the sheet supply trays 101$a$-101$d$ has been selected as the sheet supply source for the insertion sheet on the screen in FIG. 10C, then a screen instructing the orientation of the sheet to be set in the selected one of the sheet supply trays 101$a$-101$d$, as shown in FIG. 13B, is displayed on the display panel 620 (step S6). The screen shown in FIG. 13B instructs that the insertion sheet is to be placed with its top and bottom edges in a correct direction on the selected one of the sheet supply trays 101$a$-101$d$ (that is, the top of the image printed on the insertion sheet is to be disposed toward the distal end of the selected one of the sheet supply trays 101$a$-101$d$ of the apparatus as viewed in FIG. 1). Then, the apparatus waits for the OK key 631 to be pressed (step S7). When the OK key 631 is pressed, the process for setting the cover sheet/interleaved sheet mode is finished.

On the other hand, if either the "upper right" or "lower right" is selected as the stapling position in the step S2, which does not involve the image rotation, is selected, then it is determined whether or not the manual feed tray 105 has been selected as the sheet supply source on the screen for setting the insertion sheet supply source shown in FIG. 10C (step S8).

Figure 13C:
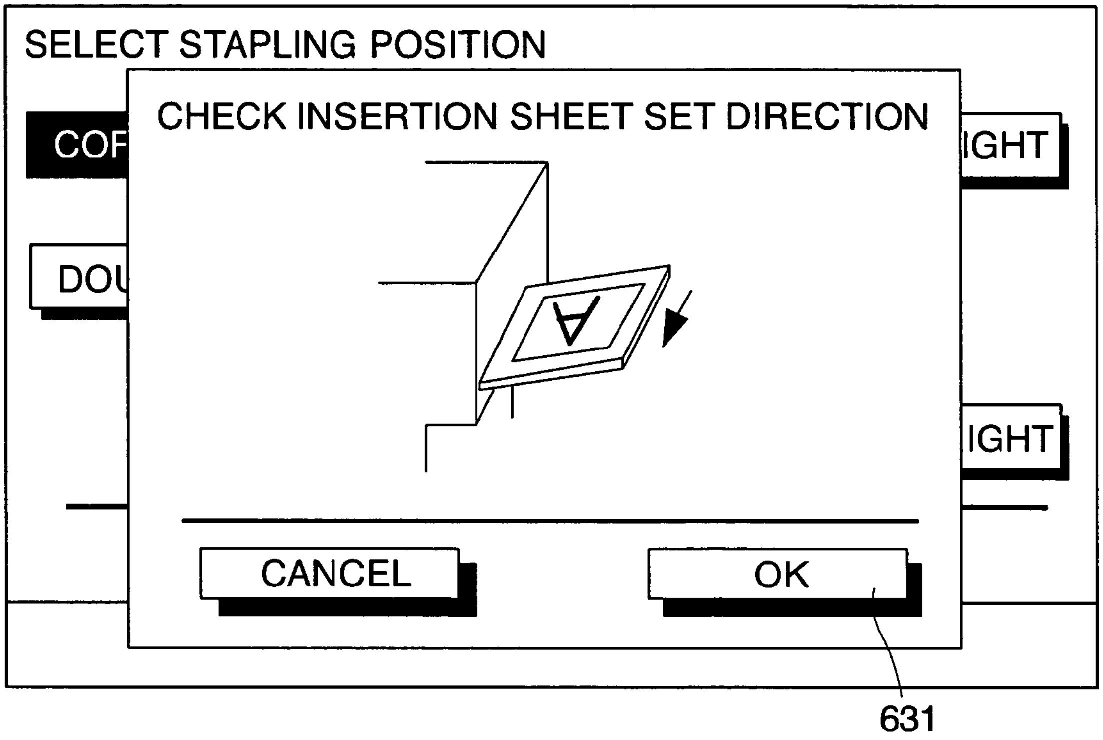

If the manual feed tray 105 has been selected, then the screen instructing the orientation of the sheet to be set in the manual feed tray 105 is displayed on the display panel 620, as shown in FIG. 13C (step S9). The screen shown in FIG. 13C instructs that the insertion sheet is to be placed with its top and bottom edges in a correct direction on the manual feed tray 105 (that is, the top of the image printed on the insertion sheet is to be disposed toward the proximal end of the manual feed tray 105 of the apparatus as viewed in FIG. 1). Thereafter, the apparatus waits for the OK key 631 to be pressed (step S10). When the OK key 631 is pressed, the process of setting the cover sheet/interleaved sheet mode is finished.

Figure 13D:
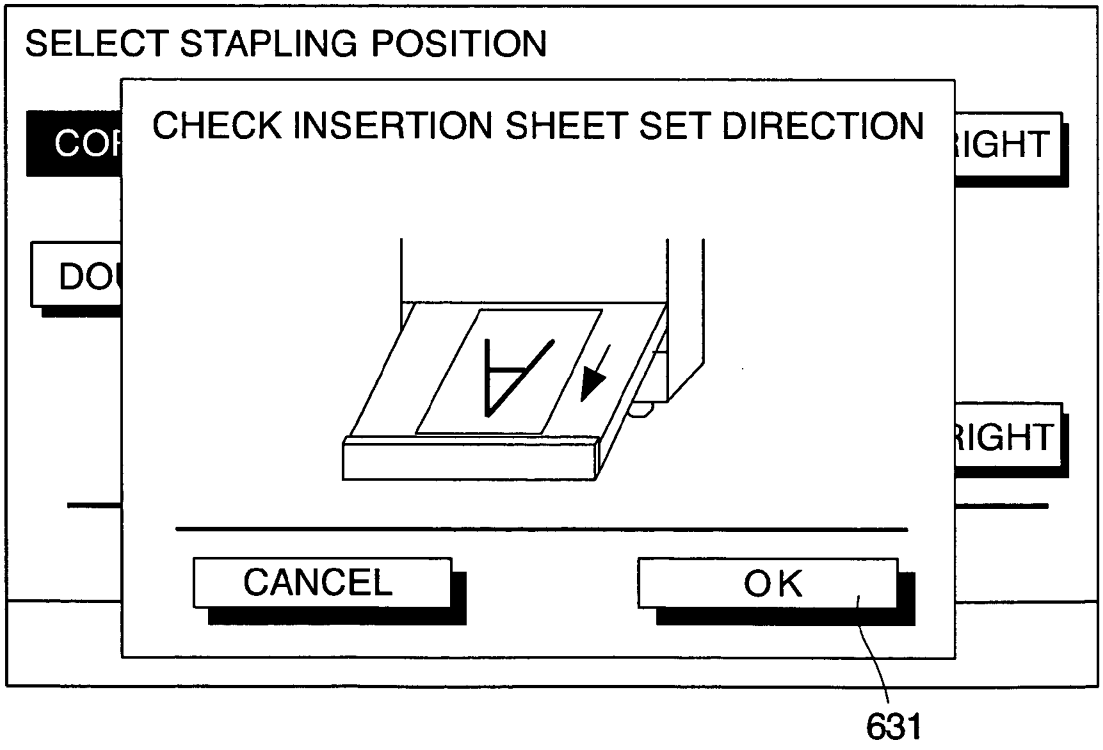

On the other hand, if in the step S8 the manual feed tray 105 has not been selected but one of the sheet supply trays 101$a$-101$d$ has been selected as the sheet supply source for the insertion sheet on the screen in FIG. 10C, then a screen instructing the orientation of the sheet to be set in the selected one of the sheet supply trays 101$a$-101$d$, as shown in FIG. 13D, is displayed on the display panel 620 (step S11). The screen shown in FIG. 13D instructs that the insertion sheet is to be placed with the top and bottom edges of the insertion sheet in a correct direction on the selected one of the sheet supply trays 101$a$-101$d$ (that is, the top of the image printed on the insertion sheet is to be disposed toward the proximal end of the selected one of the sheet supply trays 101$a$-101$d$ of the apparatus as shown in FIG. 1). Then, the apparatus waits for the OK key 631 to be pressed (step S12). When the OK key 631 is pressed, the process for setting the cover sheet/interleaved sheet mode is finished.

Next, a description will be given of a case in which the stapling mode is selected in a state in which the cover sheet/interleaved sheet mode is set.

Figure 16:
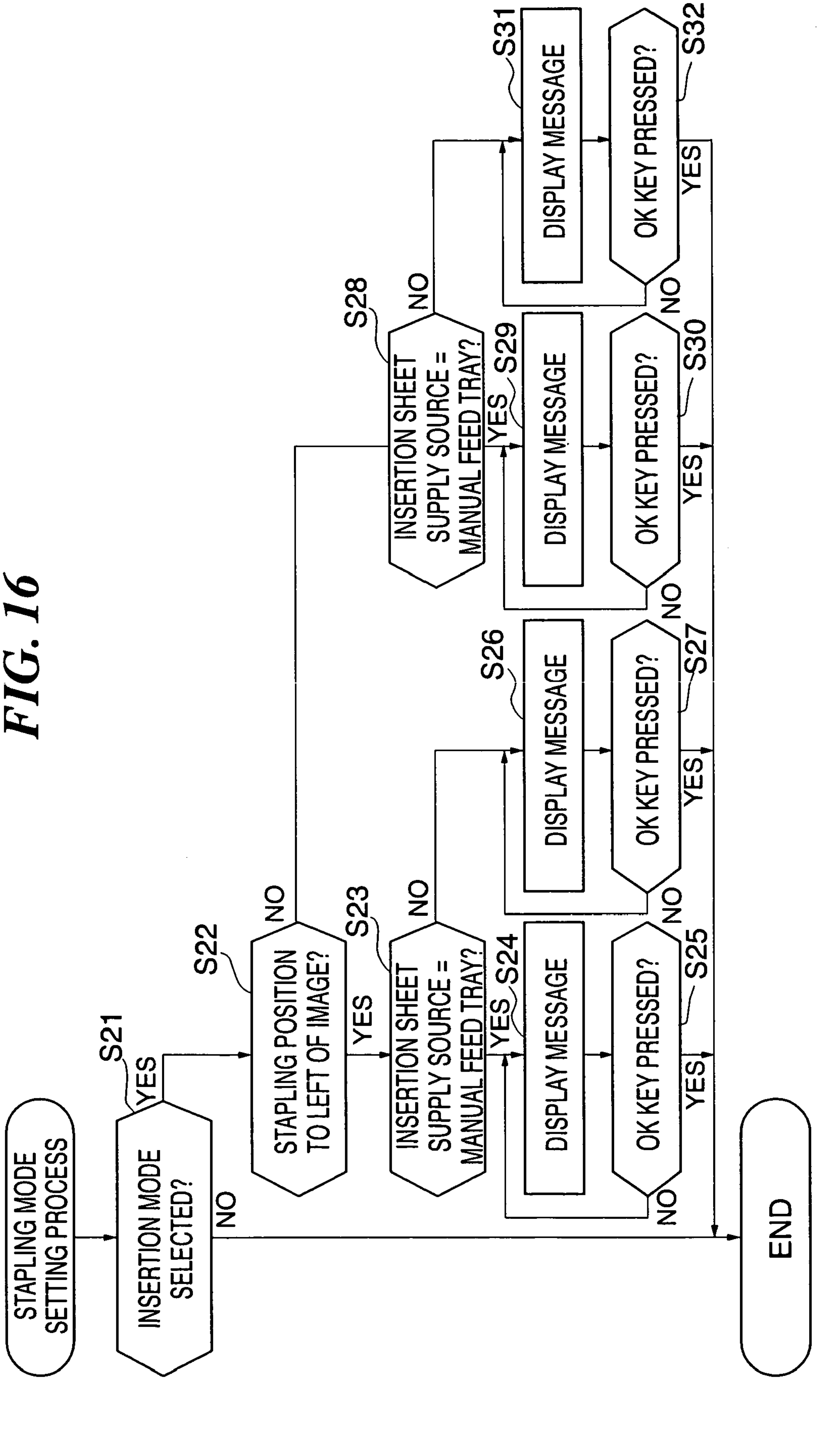
FIG. 16 is a flow chart showing a stapling mode setting process when selecting the stapling mode.

FIG. 16 is a flow chart showing a stapling mode setting process when selecting the stapling mode. A program for implementing this process is stored in the ROM 152 of the CPU circuit section 150, and is executed by the CPU 151 each time the cover sheet/interleaved sheet mode is selected.

First, it is determined whether or not the insertion sheet mode has been already selected (step S21). If the stapling mode has not yet been selected, then the process is terminated. However, if the insertion sheet mode has been already selected, then it is determined whether or not the user has selected as the stapling position "upper left" or "lower left" on the screen for setting the stapling position shown in FIG. 7C (step S22).

If the "upper left" or "lower left" has been selected as the stapling position, then it is determined whether or not the manual feed tray 105 has been selected as the sheet supply source in the cover sheet/interleaved sheet mode (step S23). If the manual feed tray 105 has been selected, then a screen instructing the orientation of a sheet to be set on the manual feed tray 105, as shown in FIG. 13A, is displayed on the display panel 620 (step S24). Thereafter, the apparatus waits for the OK key 631 to be pressed (step S25). When the OK key 631 is pressed, the process for setting the stapling mode is finished.

On the other hand, if in the step S23 one of the sheet supply trays 101$a$-101$d$ has been selected as the sheet supply source in the cover sheet/interleaved sheet mode, then a screen instructing the orientation of the sheet to be set in the selected one of the sheet supply trays 101$a$-101$d$, as shown in FIG. 13B, is displayed on the display panel 620 (step S26). Then, the apparatus waits for the OK key 631 to be pressed (step S27). When the OK key 631 is pressed, the process for setting the stapling mode is finished.

On the other hand, if in the step S22 the “upper right” or “lower right” has been selected as the stapling position, which does not involve the image rotation, then it is determined whether or not the manual feed tray 105 has been selected as the sheet supply source in the cover sheet/interleaved sheet mode (step S28). If the manual feed tray 105 has been selected, then the screen instructing the orientation of the sheet to be set in the manual feed tray 105, as shown in FIG. 13C (step S29) is displayed on the display panel 620. Then, the apparatus waits for the OK key 631 to be pressed (step S30). When the OK key 631 is pressed, the process for setting the stapling mode is finished.

On the other hand, if in the step S28 one of the sheet supply trays 101*a*-101*d* is selected as the sheet supply source in the cover sheet/interleaved sheet mode, then a screen instructing the orientation of the sheet to be set in the selected one of the sheet supply trays 101*a*-101*d*, as shown in FIG. 13D, is displayed on the display panel 620 (step S31). Then, the apparatus waits for the OK key 631 to be pressed (step S32). When the OK key 631 is pressed, the process for setting the stapling mode is finished.

Figure 17A:
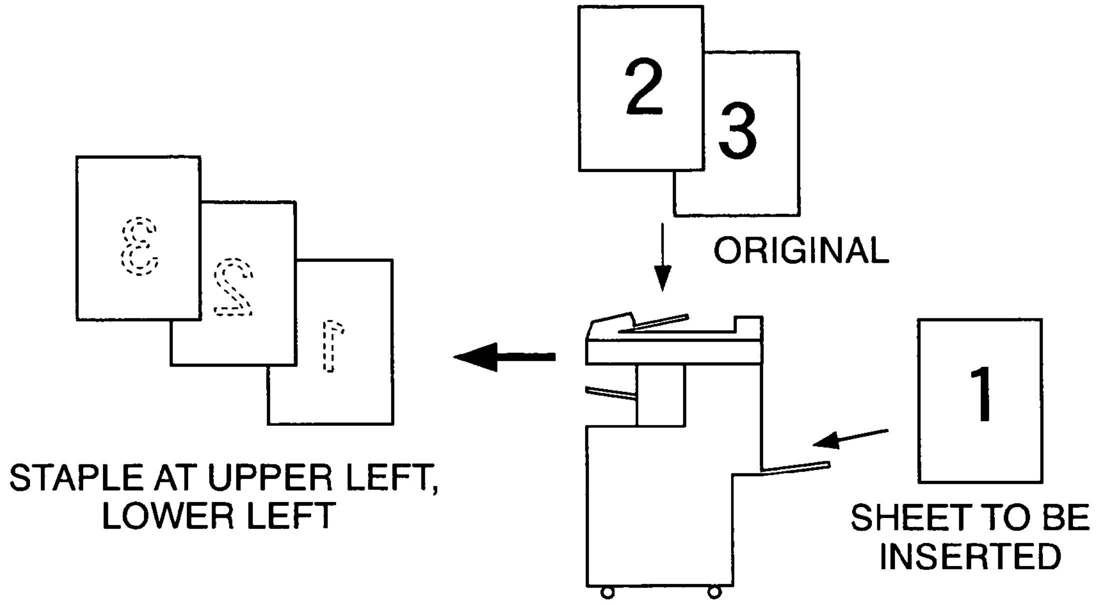
FIGS. 17A and 17B are diagrams showing the relationship between stapling positions and insertion sheet orientations.
Figure 17B:
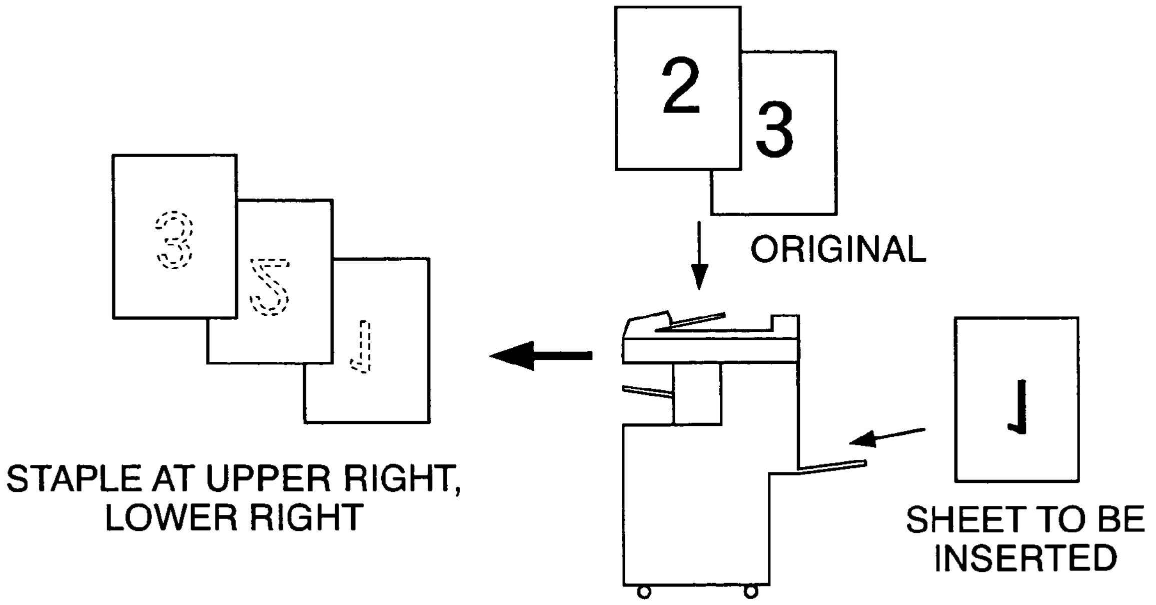

FIGS. 17A and 17B are diagrams showing the relationship between stapling positions and orientations. The diagrams show a case in which images are formed on second and third page sheets, a sheet is inserted at a first page in the cover sheet mode, and stapling is performed by the finisher 500. A recording sheet, on which an image has been formed by scanning an original set in the original feeder 400, and an insertion sheet are discharged face down onto the stack tray 507.

In FIG. 17A, the upper left or the lower left has been selected as the stapling position. In this case, the insertion sheet is set such that the top edge of the sheet is disposed toward the distal end of the image forming apparatus as viewed in FIG. 1, and hence a bundle of sheets is discharged with the inserted sheet and the recording sheet being oriented in the same direction. On the other hand, in FIG. 17B, the upper right or the lower right has been selected as the stapling position, which does not involve rotation of the image. In this case, the insertion sheet is set such that the top edge of the sheet is disposed toward the proximal end of the image forming apparatus as viewed in FIG. 1, and hence a bundle of sheets is discharged with the inserted sheet and the recording sheet being oriented in the same direction.

According to the present embodiment, as described above, when a combination of the cover sheet/interleaved sheet mode and the stapling mode has been selected, the user is informed of the direction in which the insertion sheet is to be set, and therefore the sheets on which images are formed and the inserted sheet can be given the same orientation. Further, there is no limitation on the stapling position to be set. Furthermore, by performing stapling while rotating the image, the problem of the recording sheet and the inserted sheet having different orientations, which arose in the prior art, can be prevented.

The present invention is not limited to the arrangement of the embodiment described above, and any configuration that can achieve the functions described in the claims or the functions of the arrangement of the embodiment can be applied to the present invention.

For example, in the above-described embodiment, the sheet supply source for the insertion sheet and the direction of insertion thereof are displayed in the form of illustrations. Alternatively, the sheet supply source for the insertion sheet can be displayed by cassette number or the like, so that the sheet supply source can be easily understood.

Moreover, in the above-described embodiment, the direction of insertion of the sheet to be inserted is displayed on the operating/display section 600 provided on the image forming apparatus main body. Alternatively, a printer driver program according to which a personal computer (PC) causes the image forming apparatus to execute image formation may display the direction of insertion of the sheet to be inserted on a driver screen displayed on a display unit of the PC, according to a stapling position set on the driver screen. In such a case, the printer driver program may be stored on a CD-ROM or a floppy disk, and installed in the PC by being read out from the CD-ROM or floppy disk. Further alternatively, a printer driver program stored on an Internet site may be downloaded to the PC through the Internet and installed in the PC.

Moreover, although in the above-described embodiment control is provided to perform settings of the image forming apparatus so as to perform double stapling on a discharged bundle of sheets at one corner thereof (the “corner” key in FIG. 7C), that is, at only a single position, the settings of the image forming apparatus can also be controlled so as to staple the discharged bundle of sheets at two positions (the “double” key in FIG. 7C). When a setting is made to staple the bundle of sheets at the left side of the images at two positions thereof, in the same manner as when the upper left or the lower left is set as the stapling position, the image forming apparatus may instruct on the display that the cover sheet or the insertion sheet is to be placed with the left side of an image on the cover sheet or the insertion sheet being disposed ahead in the sheet conveying direction (that is, the sheet is to be placed face up on the manual feed tray, with the left side of the image being disposed toward the image forming apparatus main body, or placed face up in the sheet supply cassette, with the left side of the image being disposed to the right), and the image forming apparatus may form the image such that the left side of the image is disposed toward the leading edge of the sheet. On the other hand, When a setting is made to staple the bundle of sheets at the right side of the images at two positions thereof, in the same manner as when the upper right or the lower right is set as the stapling position, the image forming apparatus may instruct on the display that the cover sheet or the insertion sheet is to be placed with the right side of an image on the cover sheet or the insertion sheet being disposed ahead in the sheet conveying direction (that is, the sheet is to be placed face up on the manual feed tray, with the right side of the image being disposed toward the image forming apparatus main body, or placed face up in the sheet supply cassette, with the right side of the image being disposed to the right), and the image forming apparatus may form the image such that the right side of the image is disposed toward the leading edge of the sheet.

Moreover, when a setting is made to perform double stapling on the bundle of sheets at the top side of the images, the image forming apparatus may instruct on the display that the cover sheet or the insertion sheet is to be placed with the top side of an image on the cover sheet or the insertion sheet being disposed ahead in the sheet conveying direction (that is, the sheet is to be placed face up on the manual feed tray, with the top side of the image being disposed toward the image forming apparatus main body, or placed face up in the sheet supply cassette, with the top side of the image being disposed to the right), and the image forming apparatus may form the image such that the top side of the image is disposed toward the leading edge of the sheet. On the other hand, when a setting is made to perform double stapling on the bundle of sheets at the bottom side of the images, the image forming apparatus may instruct on the display that the cover sheet or the insertion sheet is to be placed with the bottom side of an image on the cover sheet or the insertion sheet being disposed ahead in the sheet conveying direction (that is, the sheet is to be placed face up on the manual feed tray, with the bottom side of the image being disposed toward the image forming apparatus main body, or placed face up in the sheet supply cassette, with the bottom side of the image being disposed to the right), and the image forming apparatus may form the image such that the bottom side of the image is disposed toward the leading edge of the sheet.

Moreover, although in the above-described embodiment, the insertion sheet is shown as conveyed to the finisher (sheet processing device) through a conveying path inside the image forming apparatus main body from the manual feed tray or a sheet supply tray, alternatively a sheet insertion device in which sheets to be inserted are stacked may be provided on the sheet processing device side. In such a case, the supplied insertion sheet is conveyed without passing through the conveying path inside the image forming apparatus main body.

Further, although in the above-described embodiment, stapling is performed as the post-processing, the present invention is not limited to stapling but encompasses a variety of post-processing operations such as hole-punching, bonding and cutting. In addition, the interleaved sheet is not limited to any particular type of sheet, and may be a tabbed sheet, a color sheet or the like. Moreover, the sheet processing device may be disposed inside the housing of the image forming apparatus or outside the housing of the image forming apparatus.

According to the above-described embodiment, when sheet insertion processing and post-processing are performed in combination, it is possible to perform post-processing so as to ensure that sheets on which images are formed and inserted sheets are aligned in orientation.

What is claimed is:

1. An image forming apparatus capable of having attached thereto a post-processing device that performs a post-process on sheets with images formed thereon, comprising:

a first conveying device that conveys a first type of sheet;

an image forming device that forms an image on the first type of sheet;

a sheet supply tray on which a second type of sheet is placed, the second type of sheet to be inserted at a predetermined position in a bundle of the first type of sheets on which images have been formed;

a second conveying device that conveys the second type of sheet from said sheet supply tray;

an input device that inputs an instruction as to which end of the first and the second type of sheets is to be subjected to the post-process; and a placing direction informing device that informs a placing direction in which the second type of sheet is to be placed on said sheet supply tray, according to the instruction input by said input device.

2. An image forming apparatus as claimed in claim 1, wherein said placing direction informing device informs the placing direction in which the second type of sheet is to be placed on said sheet supply tray, according to a top and bottom direction of the image formed on the first type of sheet by said image forming device.

3. An image forming apparatus as claimed in claim 1, wherein said placing direction informing device graphically displays the placing direction in which the second type of sheet is placed on said sheet supply tray.

4. An image forming apparatus as claimed in claim 1, wherein the post-process is any one of a stapling process, a hole-punching process, a bonding process, and a cutting process.

5. An image forming apparatus as claimed in claim 1, wherein said image forming device controls an orientation of the image formed on the first type of sheet in response to a result of the instruction inputted by said input device.

6. An image forming apparatus comprising:

a first conveying device that conveys a first type of sheet;

an image forming device that forms an image on the first type of sheet;

a sheet supply tray on which a second sheet is placed, the second type of sheet to be inserted at a predetermined position in a bundle of the first type of sheets on which images have been formed;

a second conveying device that conveys the second type of sheet from said sheet supply tray;

a post-processing device that performs a post-process on an end of the first type of sheet, on which an image has been formed by said image forming device and an end of the second type of sheet end;

an input device that inputs an instruction as to which end of the first and the second type of sheets is subjected to the post-process; and a placing direction informing device that informs a placing direction in which the second type of sheet is to be placed on said sheet supply tray, according to the instruction input by said input device.

7. An image forming apparatus as claimed in claim 6, wherein said image forming device controls an orientation of the image formed on the first type of sheet in response to a result of the instruction inputted by said input device.

8. A sheet placing direction instructing method for an image forming apparatus including a first conveying device that conveys a first type of sheet, an image forming device that forms an image on the first type of sheet, a sheet supply tray on which a second type of sheet is placed, the second type of sheet to be inserted at a predetermined position in a bundle of the first type of sheets on which images have been formed, a second conveying device that conveys the second type of sheet from the sheet supply tray, and a post-processing device that performs a post-process on an end of the first type of sheet, on which an image has been formed by the image forming device, and an end of the second type of sheet, the method comprising:

an input step of inputting an instruction as to which end of the first and the second type of sheets is subjected to the post-process; and a placing direction informing step of informing a placing direction in which the second type of sheet is to be placed on the sheet supply tray, according to the instruction input in said input step.

* * * * *